Jan. 9, 1934.   H. D. JAMES   1,943,119
CIRCUITOUS ELEVATOR
Filed Dec. 17, 1929   9 Sheets-Sheet 1

INVENTOR
Henry D. James.
BY
Wesley G. Carr
ATTORNEY

Jan. 9, 1934.  H. D. JAMES  1,943,119
CIRCUITOUS ELEVATOR
Filed Dec. 17, 1929  9 Sheets-Sheet 2

INVENTOR
Henry D. James.
BY
Wesley G. Carr
ATTORNEY

Jan. 9, 1934. H. D. JAMES 1,943,119
CIRCUITOUS ELEVATOR
Filed Dec. 17, 1929 9 Sheets-Sheet 3

INVENTOR
Henry D. James.
BY
Wesley G. Carr
ATTORNEY

Jan. 9, 1934.   H. D. JAMES   1,943,119
CIRCUITOUS ELEVATOR
Filed Dec. 17, 1929   9 Sheets-Sheet 4

INVENTOR
Henry D. James.
BY
Wesley G. Carr
ATTORNEY

Jan. 9, 1934.  H. D. JAMES  1,943,119
CIRCUITOUS ELEVATOR
Filed Dec. 17, 1929   9 Sheets-Sheet 5

INVENTOR
Henry D. James.
BY
ATTORNEY

Jan. 9, 1934.   H. D. JAMES   1,943,119
CIRCUITOUS ELEVATOR
Filed Dec. 17, 1929   9 Sheets-Sheet 8

INVENTOR
Henry D. James.
BY
Wesley G. Carr
ATTORNEY

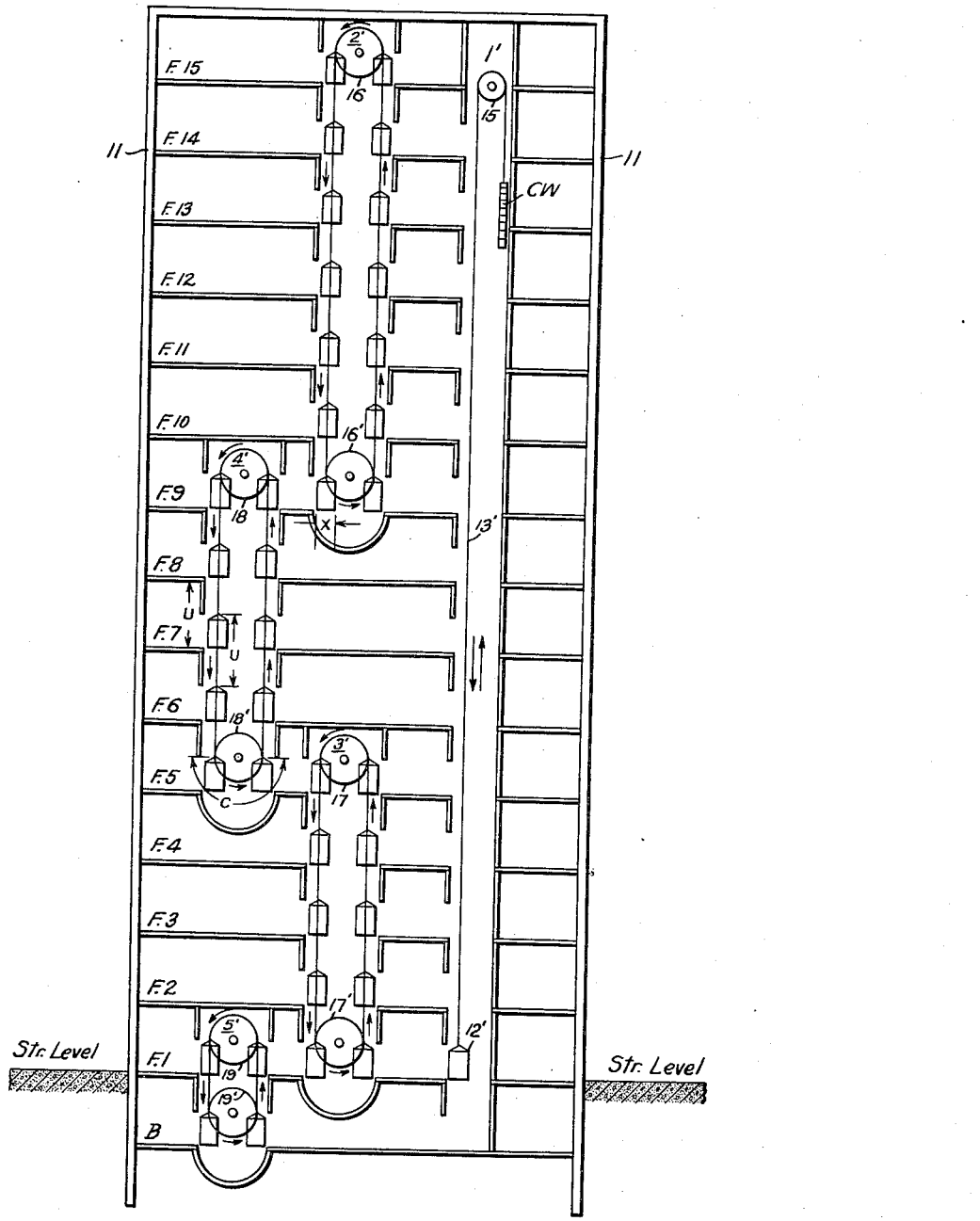

Patented Jan. 9, 1934

1,943,119

UNITED STATES PATENT OFFICE 1,943,119

CIRCUITOUS ELEVATOR

Henry D. James, Edgewood, Pa., assignor to Westinghouse Electric & Manufacturing Company, a corporation of Pennsylvania Application December 17, 1929. Serial No. 414,683

22 Claims. (Cl. 187—16)

My invention relates to passenger elevators, particularly passenger elevators of the circuitous or continuous type and, more particularly, to methods of adapting passenger elevators of the circuitous or continuous type to buildings wherein details of construction of one type of unit are shown and still more particularly to a method for automatically controlling the operation of the elevator system.

The disadvantage of utilizing valuable floor space in buildings located in a valuable downtown area of large cities for elevator hatchways is obvious. Any elevator system which utilizes but a very small floor space and yet has adequate capacity for handling all the passenger traffic in the building with rapidity has necessarily a decided advantage over elevator systems requiring a comparatively large amount of floor space and effecting a comparatively slower movement of traffic.

My invention, which includes the adaptation of circuitous type elevators to buildings such as office buildings, department stores, apartment houses, hotels, etc. for mass transportation of passengers has, therefore, this advantage over reciprocating elevator systems of the passenger service type because of its capacity for handling a comparatively greater number of passengers with a minimum number of hatchways.

It should be understood by those skilled in the art that by a circuitous or continuous elevator is meant an elevator system comprising a series of elevator cages or platforms suitably supported and movable successively through two vertical adjacent hatchways in a circuitous path. I have shown one type of construction in which the elevator cages are supported from and between a pair of endless chains, each of the chains having a contour of an elongated loop and being supported by an upper sheave or sprocket wheel and a lower sheave or sprocket wheel. However, the particular type of circuitous elevator to be utilized is not material to my invention although I have shown and will describe later a preferred type of construction.

It is known that circuitous elevators have been suggested for freight service, particularly for moving automobiles from one floor of a building to another, and even for utilizing the elevator system itself as a storage device for automobiles. However, the speed of movement of the circuitous elevator systems adapted for passenger use is comparatively a great deal higher than the speed of movement of circuitous elevators adapted for freight use or for automobile storage and, therefor, presents consequent problems which are not evidenced in the slower moving freight service circuitous elevators.

It is, therefore, an object of my invention to construct a practical and commercial elevator system of the circuitous type adapted for passenger use.

Another object of my invention is to provide a guiding means for each individual cage during its transfer movement from one column to another to prevent swinging thereof and to maintain the cage in a substantially vertical position.

Another object of my invention is to provide a system of passenger circuitous elevators adapted to a building in such a way as to utilize a minimum of floor space.

Another object of my invention is to provide a passenger circuitous elevator system for buildings in which the cages of the units move normally in one direction only through each of the vertical paths of their respective circuitous elevator units to effect a segregation of traffic.

Another object of my invention is to provide passenger circuitous elevators in which successive elevator cages are aligned respectively with floors spaced apart by definite regular distances.

Another object of my invention is to provide a circuitous elevator system in which there are always two elevator cages at the various stopping levels when the elevator unit is normally at rest, the one moving in a path of one direction, and the other moving in a path of the opposite direction.

Another object of my invention is to provide a control system for passenger circuitous elevators which automatically effects the stopping of the elevator cages at regular stopping levels spaced definite distances apart.

Another object of my invention is to provide a system of passenger circuitous elevators for use in tall buildings wherein the several circuitous elevator units move through different regular intervals of travel between successive stops.

Another object of my invention is to provide a passenger circuitous elevator system having an elevator cage door and a hatchway door for each vertical path at every floor interlocked with the control mechanism for the elevator moving means to prevent movement of the elevator system until all elevator doors and all hatchway doors of the entire conveyor unit are closed.

A further object of my invention is to provide a passenger circuitous elevator system in which the starting of the conveyor unit is initiated automatically upon the closing of all the hatchway doors and all the elevator cage doors.

A still further object of my invention is to provide a levelling means for each individual elevator cage of an elevator unit.

Other objects will in part be obvious and in part appreciated from the following description of my invention.

My invention is described with reference to the accompanying drawings and diagrams, wherein, Figure 1 is a diagrammatic elevational view illustrating the adaptation of circuitous elevators to a building.

Fig. 12 is a diagrammatic view illustrating the combination of a reciprocating elevator and circuitous elevator units.

My invention includes the adaptation of circuitous elevators of any type to buildings for passenger service generally, and no specific arrangement of units or combinations of units is intended. Obviously, there are a great number of combinations possible depending upon various factors, for example, the height of the building, the amount of traffic, the amount of floor space available for elevator hatchways, etc.

In addition to the advantages of a circuitous type elevator system over a reciprocating elevator system already mentioned, namely, the advantages of increased capacity for handling traffic and increased speed of service, there is another inherent advantage over the reciprocating type of elevator. It is known that reciprocating elevator systems are in use in which passenger traffic is segregated by having a series of elevators moving in one direction only, that is, more specifically, a number of elevators for moving passengers down only and a number for moving passengers up only. However, in a system of this kind, it is necessary that the entire height of the building be traversed in one direction by the elevator cages without giving useful service. In a circuitous elevator system, it will be appreciated that by maintaining a normally constant direction of movement of the units that one vertical path of movement of each unit can be utilized for moving passengers down, while the other vertical path of movement is simultaneously utilized to move passengers up. The same effect is obtained as with two separate hatchways in which reciprocating elevators move, as before explained, with the additional advantage that all of the cages are being constantly utilized, and no portion of travel of any of the cages, except at the transfer points between the two vertical paths of movement, is without useful effect.

Figure 1:
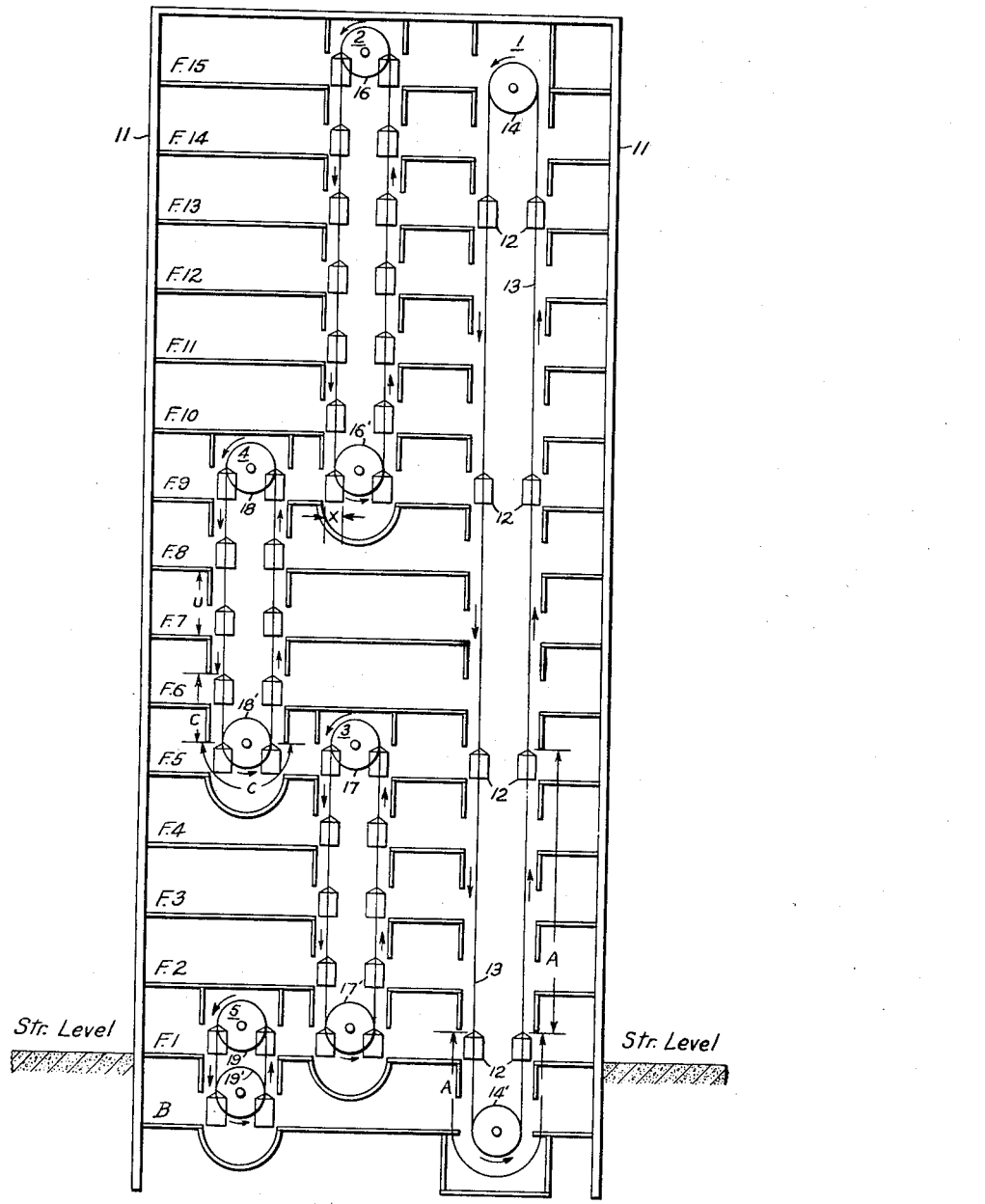
Figure 9:
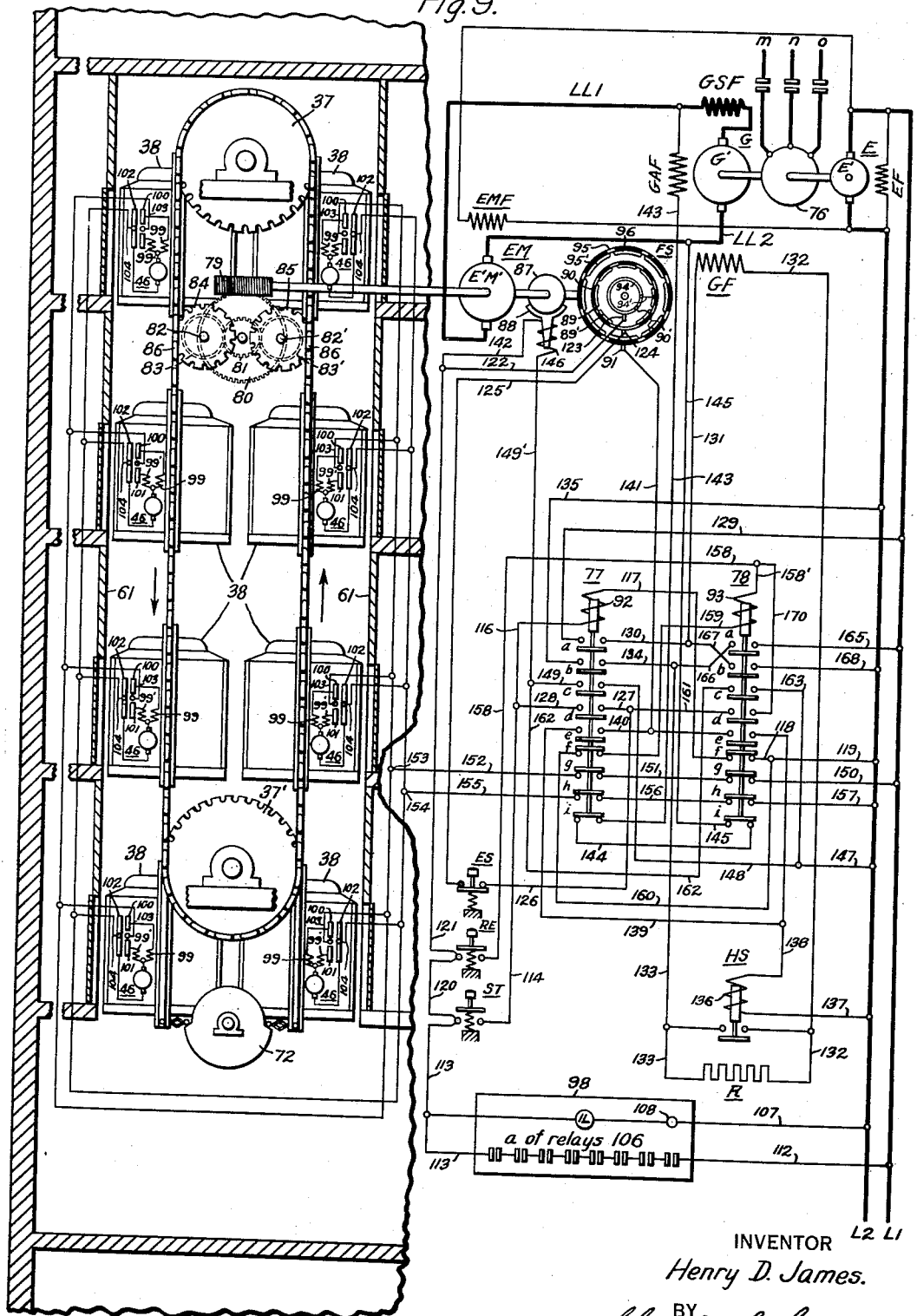
Fig. 9 is a diagrammatic view showing a circuitous elevator unit, such as any of the separate units shown in Fig. 1, adapted to a building and an electrical control system therefor.

As an illustration of one of the various modifications which my invention may take, I have shown in Fig. 1 a passenger circuitous elevator system adapted to a building in which the separate units have different spacings between successive cages (the spacing between successive cages of the same unit being the same) and moving between different levels so as to effect an operative elevator system for use in office buildings, department stores, etc. In Fig. 9 is illustrated a control system for automatically effecting the stopping of the circuitous elevator unit as a whole and the leveling of each cage of the unit individually, that is, independently of the other cages.

Referring to Fig. 1, a number of circuitous elevator units 1, 2, 3, 4 and 5 are suitably supported in the building structure 11 which has floors F1 to F15 inclusive and a basement floor B.

It will be observed that the unit 1 comprises a number of elevator cages 12 moving in two adjacent vertical paths of movement. I have shown a unit in which each of the cages 12 is supported from and between a pair of endless chains 13 (one chain of which only is shown in Fig. 1), each of the endless chains being, in turn, supported by and moving around an upper sprocket wheel or sheave 14 and a similar lower sprocket wheel or sheave 14'. These sprocket wheels or sheaves are then suitably supported on shafts mounted in bearings fixed in the building structure. However, this is but one of a number of types of circuitous elevator systems and my invention is not meant to be limited to this one type of system only. Obviously, any of the other types of circuitous elevator systems known in the art may be used as well.

It will be further observed that the cages 12 are spaced along the supporting chains 13 at regular intervals from each other, namely, a distance of four floors. This distance, it should be understood, is an arbitrary one since I have shown it as four floors merely for the sake of illustration. Obviously, the cages 12 might be spaced from each other any number of floors apart.

The units 2, 3, 4 and 5 are identical in structural details with those of unit 1. They differ only in the floors past which they move and in the fact that successive cages are spaced from each other only a distance equal to the distance between successive floors.

The movement of the separate units is normally in one direction as indicated by the arrows, that is, the cages in the left-hand path of movement of each unit move normally only in a downward direction and the cages in the right-hand path of movement move normally only in an up direction. The cages 12 of the unit 1 move a distance of four floors between successive stops and, at each position of the unit, there are two cages at the same stopping level, one of the cages prepared to move in a down direction and the other prepared to move in an up direction. Obviously, the sheaves or sprocket wheels 14 and 14' are so positioned in the building structure that a particular cage 12 moving from the last stopping level in one direction transfers around either of the pairs of sprocket wheels or sheaves 14 to an opposite direction of movement and stops at the next stopping level after the transfer, in the same time that another of the cages moves a distance of four floors in either of the vertical paths of movement. Dimension lines A in Fig. 1 show this for unit 1. Thus, regardless of the position in which the unit stops, there are always, for normal operation, two cages at the same stopping level. In this way, passengers desiring to go to lower floors are loaded simultaneously with passengers desiring to go to upper floors. Moreover, each of the separate classes of passenger traffic is segregated, that is, each goes to different cages. Therefore, the consequent confusion and time delay which is the result of passengers moving in and out of a single elevator cage at the same time is avoided. It is appreciated that, at intermediate floors, between the upper and lower terminals, that is, floors F13 and F1, respectively, passengers may move in and out of the same elevator cage at the same time. However, in situations of this kind, there is very small likelihood that any confusion will occur comparable to the confusion, such as sometimes occurs in reciprocating elevator systems, since the number of passengers desiring to be raised to upper floors from lower floors intermediate of the terminal floors or the number of passengers desiring to descend from upper intermediate floors is very small compared to the number of passengers entering a particular cage at the terminal floors and, therefore, passengers may leave a particular elevator cage while others may enter it at intermediate floors with no objectionable confusion or delay. The advantages of the segregation of traffic are most noticeably effective at the terminal floors.

I have shown three separate units 2, 3 and 4, as illustrated in Fig. 1, so placed that units 2 and 3 are in vertical alinement and unit 4 located adjacent to the vertical column occupied by units 2 and 3. It should be understood that this is merely one form which my invention may take, since units 2, 3 and 4 may be combined into one unit occupying but two adjacent vertical columns. However, the mechanical problems presented by such a construction, for example, the stresses to which the supporting chains are subjected due to the great load of the cages supported therefrom, are such that it is desirable to limit the number of cages supported from a particular section of chain. It is appreciated that sprocket wheels intermediate of the upper and lower sprocket wheels may be so positioned that additional support is so given to the endless chains that the stresses in the various sections between successive pairs of sprocket wheels are limited to normally safe values.

In each of the units 2, 3 and 4, the movement of the cages between successive stopping levels is one floor distance only and at each of the stopping positions, as in unit 1, two cages stop simultaneously at the same floor, one of the cages being in one direction of movement and the other being in an opposite direction of movement. The diameters of each of the sprocket wheels 16, 16', 17, 17', 18 and 18' are shown to be of such size that the distance between floors is equal to half their circumferences. Dimension C in Fig. 1 shows this for unit 4. Thus, the top cage in one path of movement and the bottom cage in the other path of movement of a particular unit transfer around the sprocket wheels from the last stopping level in the one path of movement to the first stopping level in the adjacent path of movement in the same time that cages in the vertical paths of movement move from one floor to the next in either direction. Obviously, however, the size of the sprocket wheels 16, 16', 17, 17', 18 and 18' could be of any logical value larger than the width X of a particular cage and smaller than that diameter required to give a circumference of twice the distance between successive floors. In any case, the sprocket wheels must be of such diameter or must be so placed to allow two cages to be alined simultaneously with the same stopping level or floor, regardless of the particular position in which the circuitous elevator unit normally stops.

The distance of normal vertical travel of the cages of unit 3 extends between floors F1 and F5 in either direction depending upon the particular path of movement in which the cage is. The distance of normal vertical travel of the cages of unit 4 extends between floors F5 and F9 in either direction depending upon the particular path of movement in which the cage is. The normal vertical distance of travel of the cages of unit 2 extends between floors F9 and F15 in either direction depending upon the particular path of movement in which the cage is.

The unit 5 is adapted for communication between two floors only, more particularly between the street level floor F1 and a basement floor B.

Figure 2:
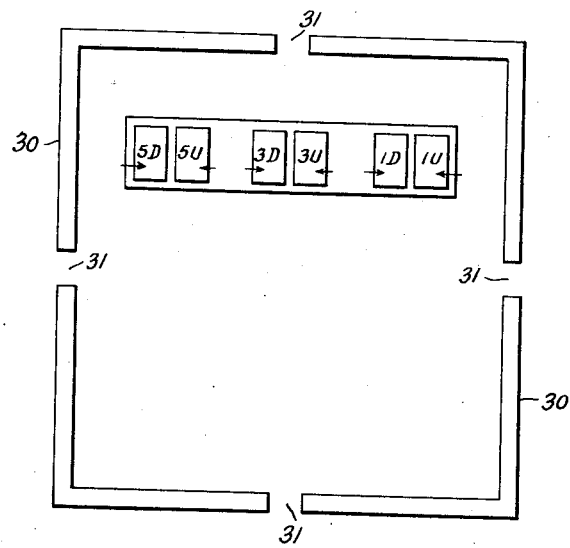
Fig. 2 is a diagrammatic plan view illustrating one layout of a circuitous elevator system in a building.
Figure 3:
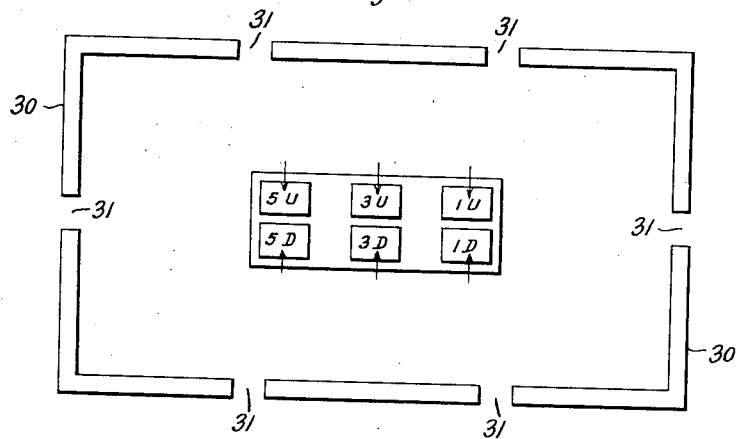
Fig. 3 is a diagrammatic plan view illustrating a modified layout of passenger circuitous elevators in a building.

A ground floor layout for a circuitous elevator system is shown in Fig. 2. The outside walls 30 are shown having the various entrances or exits 31. The units 1, 3 and 5 are shown in one layout which may be used. In Fig. 2, 1U represents the up direction path of the cages of unit 1, and 1D the down direction path of the cages in unit 1. Similarly 3U, 3D, 5U and 5D represent the respective paths of movement of cages in units 3 and 5. The small arrows indicate direction of movement of persons entering the cages in the respective hatchways. However, it is not intended that my invention be limited to this particular layout.

Figure 4:
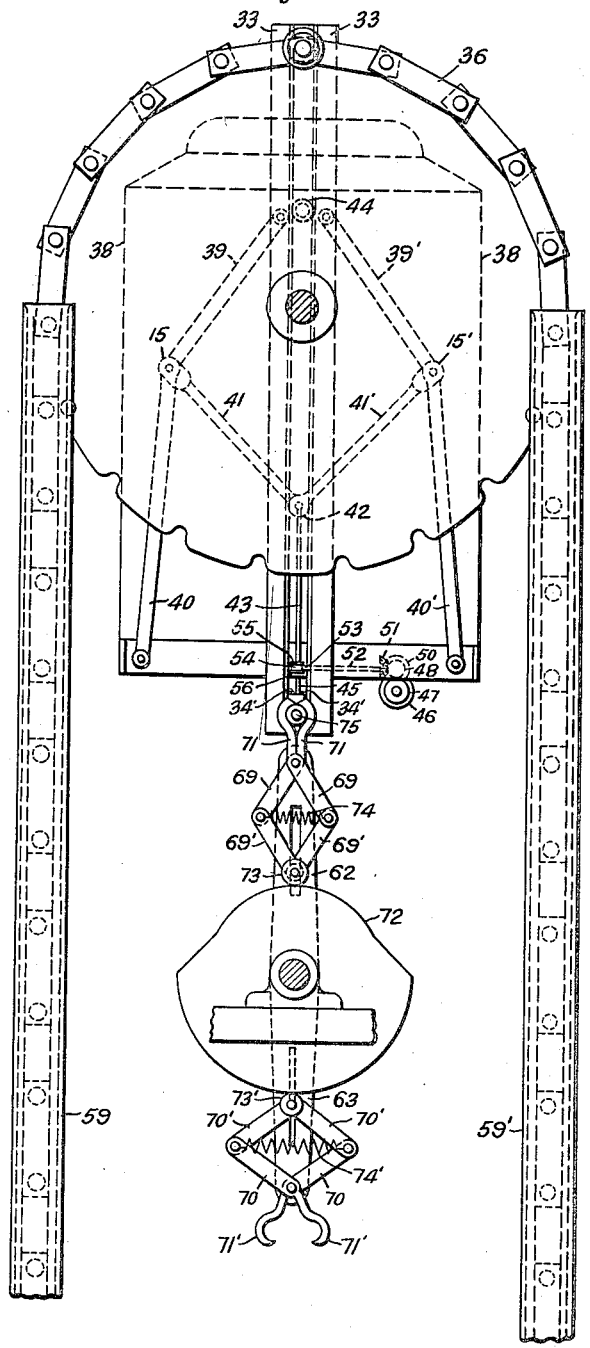
Fig. 4 is a sectional elevational view on line IV—IV of Fig. 5 of an individual elevator cage, its method of support from the endless chains and the guiding mechanism for maintaining the vertical position of the cage during the transfer around the sprocket wheels from one vertical path of movement to another.
Figure 5:
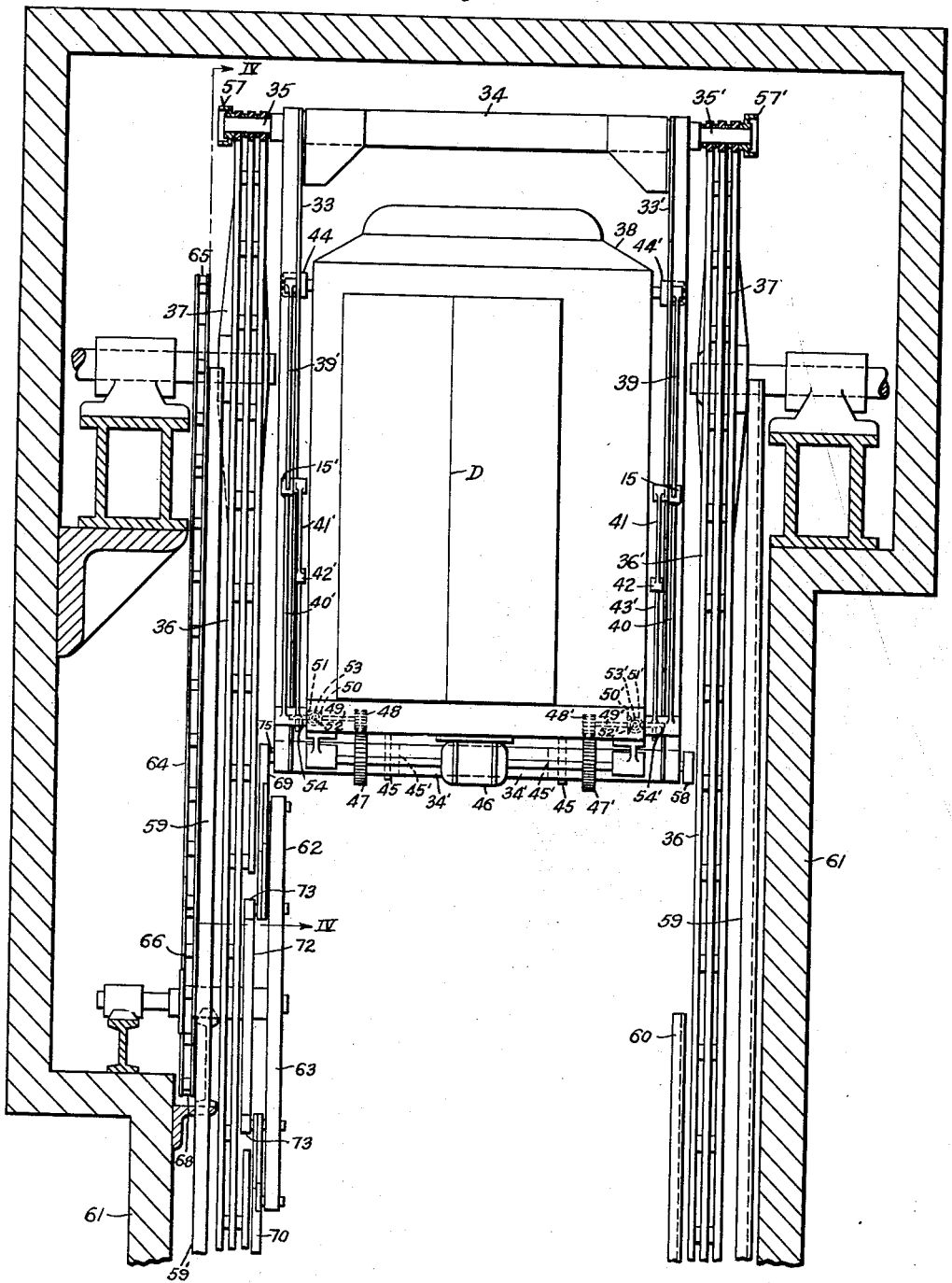
Fig. 5 is a front elevational view with parts in section and parts broken away and showing the details of an individual elevator cage, its method of support on the endless chains and the guiding mechanism for maintaining the substantially vertical position of each cage as it transfers from one vertical path to another.
Figure 6:
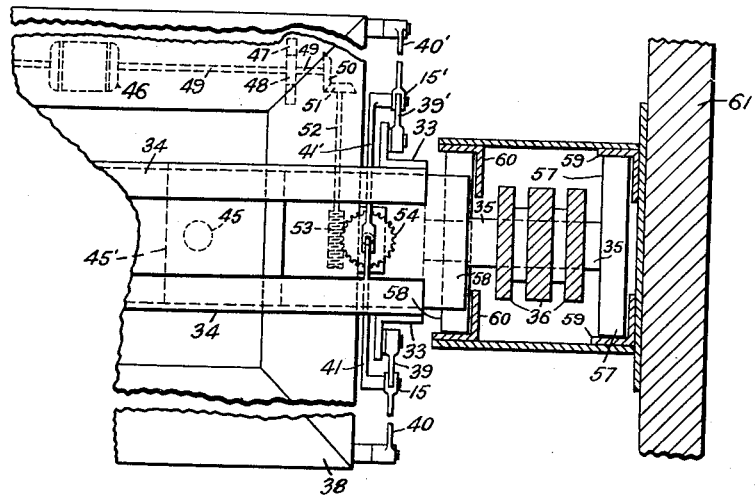
Fig. 6 is a detail view, partly in section and partly in plan view, showing the method of supporting the elevator cage frames from the endless chains and the method of guiding the elevator cages through the vertical paths of movement.

I have illustrated the details of construction of one form of circuitous elevator unit which is included in my invention, in Figs. 4, 5, 6, 7 and 8. Referring to Figs. 4 and 5, it will be seen that I have represented a cage in a position occurring during the transfer movement around the upper sprocket wheels. I have not shown the details of a cage in any other position because they are essentially the same as those shown in Figs. 4 and 5. Each cage 38 is similar in construction to standard elevator cages used in reciprocating elevator systems except that doors D (see Fig. 5) are provided on each side of the cage for entrance of passengers on either side depending upon the direction of movement of the cage.

Each cage 38 is suspended in a sling or rigid rectangular frame of structural members which frame is, in turn, pivotally attached to the endless chains. The rectangular frame comprises a pair of angle bars 33 vertically disposed on one side of the elevator cage and another pair of angle bars 33' vertically disposed on the opposite side of the cage and rigidly connected, respectively, at the top by the horizontally disposed channel members 34, and at the bottom by the horizontally disposed channel members 34'. The rectangular frame is directly supported from the endless chains on each side by means of pin members 35 and 35' suitably attached between and at opposite ends, respectively, of the horizontally disposed channel members 34 at the top of the sling. These pin members 35 and 35' extend through the endless chains to constitute connecting means between the links of the chain in the same manner as pins are normally used in a chain to connect the separate links. The endless chains 36 and 36' move around the sprocket wheels or sheaves 37 and 37', respectively. It will be observed in Fig. 5 that each chain is made up of more than two links in parallel for the purpose of increasing the strength of the chain and it should be understood that the sprocket wheels or sheaves are made up of a corresponding number of parallel discs to engage the separate roller portions between the adjacent link members. The cage 38 is suspended from the angle bar members 33 and 33' which are vertically disposed on opposite sides of it respectively by means of the suspension arms 39, 40 and 39', 40'. The arms 39 and 39' are pivotally attached to the upper portion of the angle bar members 33 and 33' respectively and the members 40 and 40' are pivotally attached to the bottom platform portion of the elevator cage. The ends of members 39 and 40 are pivotally fitted together to form the joint 15 and the ends of members 39' and 40' are fitted together to form the joint 15' and at these joints, one end of arms 41 and 41' are respectively pivotally attached. The other end of the member 41 is pivotally joined to the other end of member 41' to constitute a pivotal joint 42, at which joint a rod-like member 43, vertically disposed between the flanges of the angle bar members 33, is pivotally attached. On the opposite side of cage 38 a similar member 43' is pivotally joined to supporting arms 39, 40 and 39', 40' in a similar way. Simultaneous movement of the rod members 43 and 43' upward causes the suspension members 39, 40 and 39', 40' to be moved outwardly which effects movement of the elevator cage 38 upward with respect to the frame comprising members 33, 33', 34 and 34'. Also a simultaneous movement of the rod members 43 and 43' downwardly effects an inward movement of the suspension members 39, 40 and 39', 40' which causes the elevator cage to move downwardly with respect to the frame 33, 33', 34 and 34'. The position of the suspension members 39, 40 and 39', 40' as illustrated in Fig. 4, is such that the cage 38 is maintained in a normally central position so that movement of the cage 38 either up or down with respect to the frame may be effected.

In order to prevent a lateral swinging of the cage 38 relative to the frame from which it is suspended, roller members 44 and 44' suitably attached on opposite ends of the top of the cage 38 engage the two flanged sides of the angle bar members 33 and 33' respectively, and rod-like members 45 disposed vertically downward from the bottom of the elevator platform engage suitable holes in members 45' attached to the bottom of the frame between the channel members 34'. Thus, the elevator cage may move up or down with respect to the frame from which it is supported but is prevented from moving laterally with respect thereto.

It will be readily understood that the movement of the elevator cage with respect to its supporting frame is for the purpose of levelling each individual cage to secure exact alinement with any floor at which it may stop. The movement of the elevator cage is either up or down depending upon whether the floor of the elevator cage stops below or above a particular floor and the leveling is automatically effected by a control system which will later be described.

The control system automatically operates a split-field electric motor 46 suitably attached to the bottom of each of the elevator cages. The motor 46 causes movement of the rod members 43 and 43' on opposite sides respectively of the elevator cage 38, which effects the subsequent raising or lowering of the elevator cage with respect to the frame from which it is suspended. More specifically, the spur gears 47 and 47' keyed to the motor shaft engage spur gears 48 and 48', respectively, which are keyed to shafts 49 and 49', suitably mounted in the lower platform portion of the elevator cage. Also keyed respectively to the shafts 49 and 49' are the bevel gears 50 and 50', which engage other bevel gears 51 and 51' keyed respectively to other shafts 52 and 52'. The shafts 52 and 52' are mounted respectively at right angles to the shafts 49 and 49'. Also keyed respectively to the shafts 52 and 52' are worm gears 53 and 53' which engage, respectively, the worm wheels 54 and 54'. These worm wheels 54 and 54' are retained respectively between two bearing members 55, 56 and 55', 56', respectively, so that they may rotate therebetween. A threaded portion at the bottom of the rods 43 and 43' engages a threaded opening in the worm wheels 54 and 54', respectively. Thus, it will be obvious that the simultaneous rotation of the worm wheels 54 and 54' causes the rods 43 and 43' to be moved either up or down depending upon the direction of rotation of the worm wheels which is, in turn, dependent upon the direction of rotation of the levelling motor 46.

In order to maintain a fixed vertical path of movement of the elevator cages during movement of the elevator unit, the rollers 57 and 57' mounted on the ends of the rod-like members 35 and 35', respectively, which are attached to opposite sides of the top portion of the cage supporting frame between opposite ends respectively of the channel members 34, and the roller 58 suitably mounted between the ends of the bottom channel members 34' of the cage supporting frame are provided. The roller 57 engages a trackway formed between the flanged sides of two vertically disposed angle members 59 suitably attached to the wall of the hatchway and the roller 57' engages a similar guide 59' (see Fig. 6). The roller 58 also engages a pair of angle members 60 vertically disposed and likewise attached to the wall of the hatchway 61 to form a vertical guideway.

Figure 10:
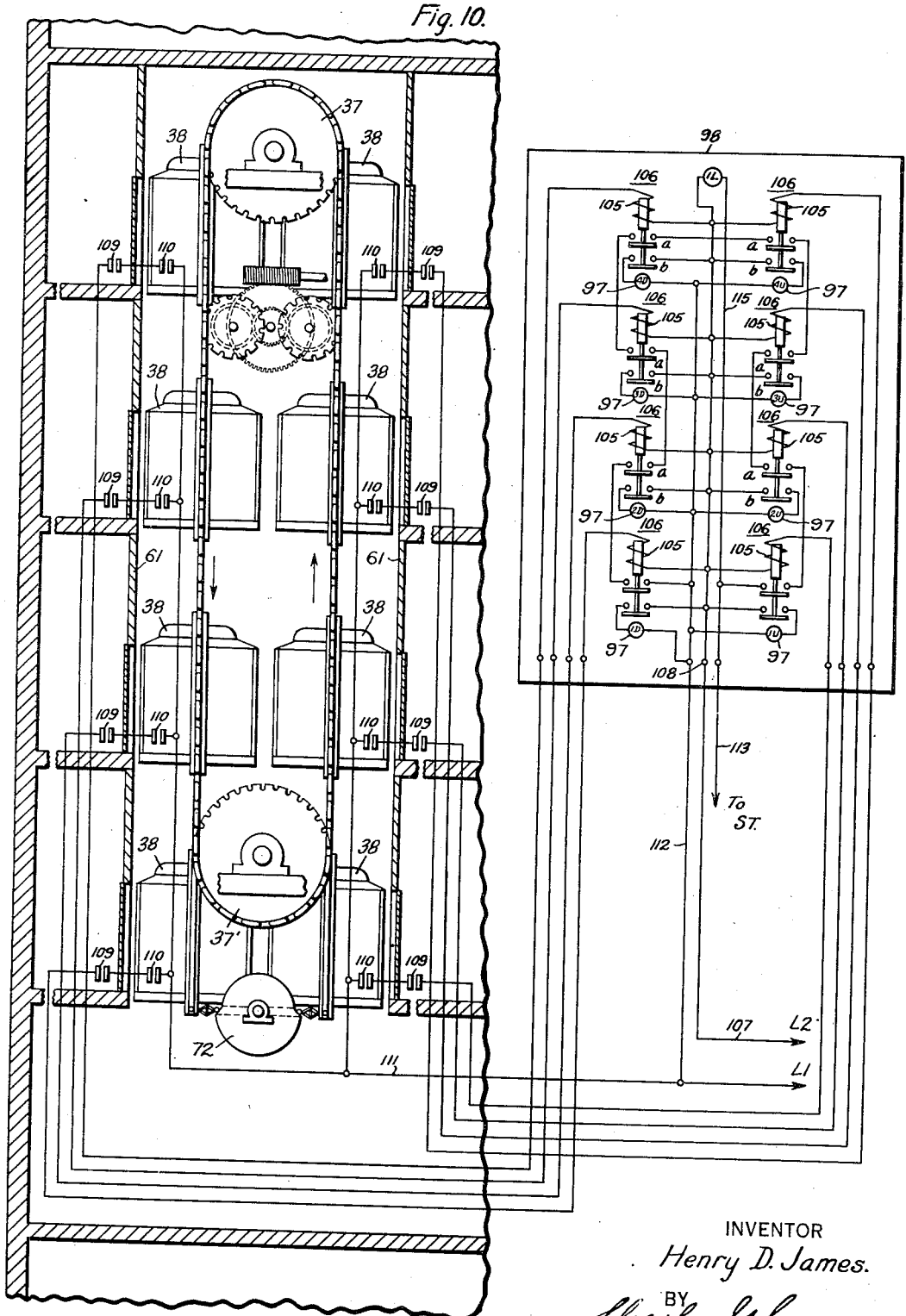
Fig. 10 is a diagrammatic view representing in detail the elevator cage door and hatchway door interlocks and the electrical control relays and indicating means controlled thereby indicated in Fig. 9.
Figure 11:
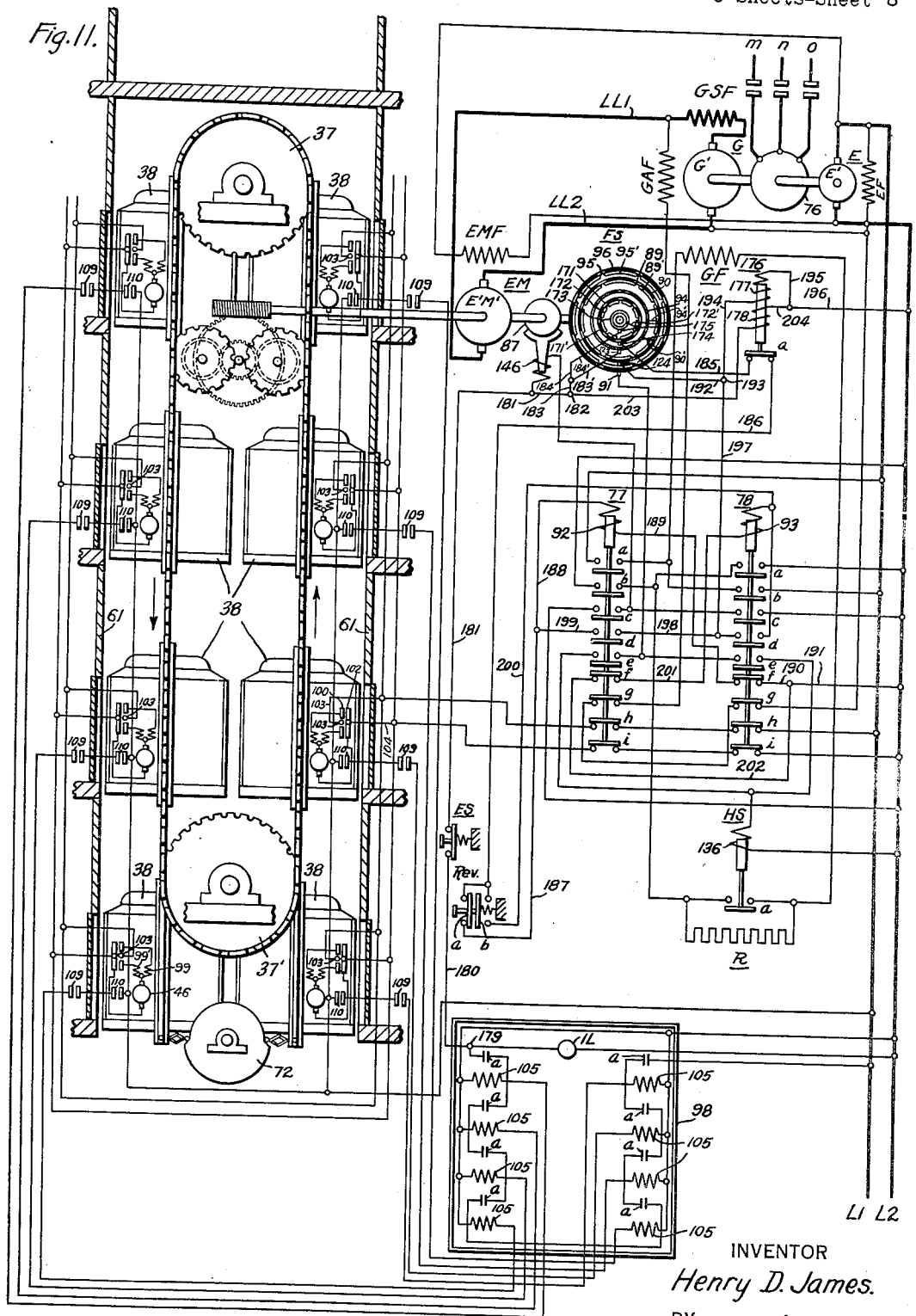
Fig. 11 is a diagrammatic view showing a modification of the control shown in Fig. 9 and whereby automatic starting of the circuitous elevator unit upon the closing of the hatchway and cage doors is effected.

In order to maintain the cage supporting frame or sling in a substantially vertical position during the transfer around the upper and lower sprocket wheels between vertical paths of movement, a guiding mechanism is provided at the top and bottom transfer points. Such a guiding mechanism is shown in detail for the top transfer point in Figs. 4 and 5. In Figs. 9, 10 and 11 such a guiding mechanism is shown for the bottom transfer point but has been omitted from the top for the sake of clarity in the drawings. Referring to Figs. 4 and 5, the guiding mechanism comprises a pair of arms 62 and 63 suitably mounted for rotation and driven in synchronism with the endless chains 36 and 36' by means of an endless chain 64 which engages a sprocket wheel 65 mounted coaxially with the sprocket wheel 37 and a sprocket wheel 66 mounted coaxially to the shaft to which the arms 62 and 63 are keyed. At the extremities of the arms 62 and 63 are mounted tong-like members, comprising members 69, 69' and 70, 70', respectively. These tong-like members operate on the pantograph principle. That is, the movement of the side members inwardly causes the outwardly extending jaws 71 (and 71') to close and movement of the side members outwardly causes the jaw members 71 (and 71') to open. Movement of these jaw members 71 (and 71') is effected by a stationary disc-like cam 72 suitably mounted as shown in Fig. 5, which engages rollers 73 and 73' on the tong members 69' and 70', respectively. Thus, it will be seen that the rotation of the arms 62 and 63 will automatically effect the operation of the jaws 71 and 71' to an open or a closed position depending upon the particular portion of the cam surface which the rollers 73 and 73' engage. Tension spring members 74 and 74' maintain the jaws 71 and 71', respectively, in a closed position during a portion of the time in which the rollers 73 and 73' engage the cam 72 and are put in additional tension during the remainder of the time that the surface of the cam 72 engages the rollers 73 and 73' to cause the jaws 71 and 71' to open.

Figure 7:
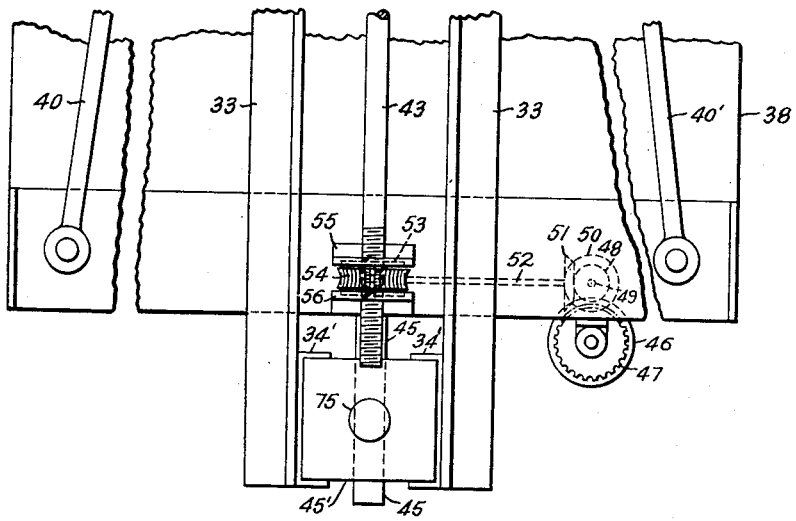
Fig. 7 is a detail end view of the bottom portion of the supporting frame for an individual elevator cage showing the central position of support of the elevator cage with respect to the supporting frame.
Figure 8:
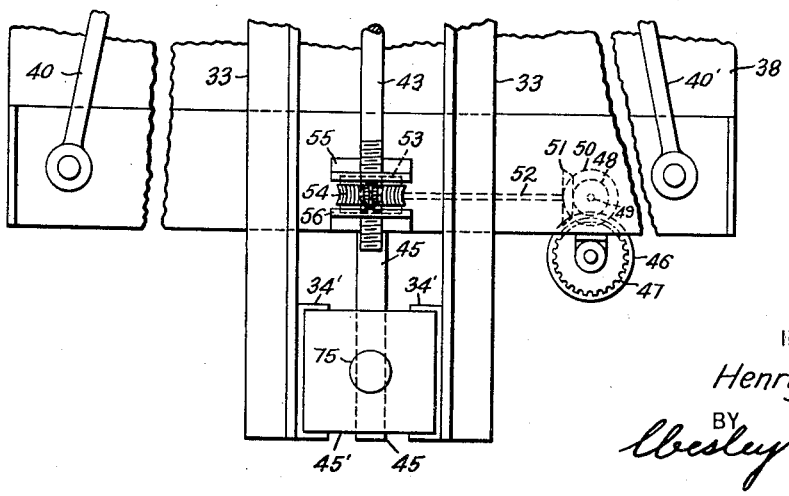
Fig. 8 is a detail end view of the bottom portion of the framework supporting an individual elevator platform for a raised position of the platform in which the elevator cage is raised from its normal position shown in Fig. 7.

The rotation of the arms 62 and 63 is so synchronized with the movement of the elevator cages that at the time that a particular elevator cage reaches the horizontal diameter of the sprocket wheels 37 and 37', that is, a position from which it leaves its vertical path of movement and begins to move around the sprocket wheels in transferring from one vertical path of movement to the other, the jaw members 71 (or 71') engage a horizontally disposed pin-like member 75 attached to one end of the bottom portion of the sling or frame between the channel members 34 (see Figs. 7 and 8). The contour of the cam 72 is such that the jaw members firmly retain the pin 75 in their grasp during the movement through the semi-circular path in transferring from the one vertical path to the other. Thus, the cage is prevented from swinging during the transfer movement and is maintained in a substantially vertical position. After the complete reversal of direction, that is, after a particular cage has again reached the horizontal diameter of the sprocket wheels around which it has moved, the contour of the cam 72 effects the movement of the jaw members to release their grip upon the pin-like member 75. Simultaneously, the roller 58 previously described reengages a vertical trackway such as formed by the angle bar members 60 in Fig. 6 and the rollers 57 and 57' reengage their respective vertical trackways, as illustrated by the guide members 59 shown in Fig. 6.

The construction of the guiding mechanism 80 comprising the arms 62 and 63 is such that successive cages are respectively engaged by diametrically oppositely disposed tong members.

My invention includes a control system for a circuitous type elevator which automatically effects movement of the unit in successive steps or intervals and automatically effects the stopping of the cages at those floors spaced a regular distance apart past which the cages move. My invention embodies the motor control system known as the variable voltage system or more commonly the Ward-Leonard system of control in which the elevator motor (in my invention, the motor which causes movement of the elevator system) is directly connected to the terminals of a compound-wound D. C. generator, the shunt field of which is controlled by direction relays to change the polarity of the potential generated by the D. C. generator. In Fig. 9 is illustrated one form which my control system may take. An alternating current motor 76 actuated from the three-phase lines $m$, $n$, and $o$, directly drives the direct current generator G and the direct current shunt wound exciter generator E. The armature G' of the generator G is connected in a loop circuit with the armature E'M' of the elevator motor EM, the series field GSF of the generator G being included in series in the loop. An auxiliary field GAF on the generator G is energized through the normally closed contact members $i$ of the direction relays 77 and 78, so that when the direction relays 77 and 78 are not energized to close the circuit through the generator field GF, the magnetic field set up by the winding GAF is in opposition to the residual magnetism of the generator G, thus reducing the voltage generated by the generator G to zero at the time that the shunt field GF of the generator G is deenergized. The elevator motor EM is a shunt motor and its shunt field winding EMF is energized by the exciter generator E from the lines L1 and L2.

The elevator motor EM drives the circuitous elevator unit through a gear train consisting of a worm gear 79 and worm wheel 80 and associated spur gear 81 which drives shafts 82 and 82' by engagement with spur gears 83 and 83' on those shafts, resulting in the rotation of sprocket wheels 84 and 85 which directly engage the endless chains 86 from which the cages are supported. I have shown but one driving mechanism and but one endless chain 86, but it should be understood that a similar driving mechanism is associated with a second endless chain similar to the chain 86, located on the opposite side of the cages.

A brake drum 87 mounted on the shaft of the elevator motor EM and a brake shoe 88 associated with the drum 87 automatically operates to perform its braking function when the elevator motor EM is stopped, that is, it is similar to a commonly known type of elevator motor brake in use today for reciprocating elevator systems in which the brake is spring-operated to engage the brake drum when the brake coil is deenergized, the energization of the brake coil effecting the release of the brake.

A drum type selector switch FS of a type similar to that employed in well known elevator control and signal systems is arranged to be moved in correspondence with the movements of the cages past the floors by connecting the floor selector to be driven by some moving part of the elevator system, such as the shaft of motor EM.

The selector switch FS is illustrated diagrammatically as comprising a drum having three collector or commutator rings. One ring comprises conducting segments 89 connected together by conductors 89′ but separated on the outer periphery of the ring by intervening non-conducting segments 90. A brush 124 engages the segments 89 and 90 successively. These segments 89, which may or may not correspond to the number of cages in the elevator itself, are of such length and are so spaced so that the engagement of the brush 124 with any one segment determines the distance which the circuitous elevator unit will move between successive stops. In Fig. 9, the successive cages being alined with successive floors of the building the length of the segments 89 is such that the circuitous elevator system will move but one floor distance between successive stops.

The circuit through the energizing coils 92 and 93, respectively, of the direction relays 77 and 78 is maintained through the medium of the engagement of the brush 124 and the commutator ring comprising the segments 89 and 90.

Another of the said rings comprises a continuous ring of conducting material 94 mounted on the drum of the selector switch FS and properly insulated from the drum but connected to each of the conducting segments 89 by connecting conductor 94′.

The last commutator or collector ring is mounted on the drum of the selector switch FS adjacent to the two rings previously described and comprises the conducting segments 95 connected together by the conductors 95′ but separated on their outer peripheries by the non-conducting segments 96. The ring 94 is connected to each of the segments by the conductor 90′. A brush 91 engages the segments 95 and 96 successively. The length of the segments 95 is such and they are so spaced and positioned with respect to the segments 89 that a control circuit for the high speed relay HS which shunts the resistor R in series with the shunt field GF of the generator G, is completed through the brush 91 and a segment 95 only over an intermediate central portion of the time that the circuit through the segments 89 is maintained. The function of the commutator ring comprising segments 95 and 96 which will be explained in detail later is, briefly, to allow high speed operation of the elevator motor EM only for an intermediate portion of the travel of the cages between successive stops.

In order to ensure the safety and protection of passengers in a circuitous elevator system, such as used in my invention, it is obviously necessary to be sure that all the hatchway doors and all the elevator cage doors are completely closed before the circuitous elevator unit can move. Therefore, a number of relays 106, mounted on an indicating panel board 98, are provided which are controlled individually by hatchway switches 109 and elevator door switches 110 (see Fig. 10) corresponding thereto, both groups of these switches being of a commonly known type and operative to a closed position when the respective hatchway doors and the elevator cage doors operating them are closed. The normally open contact members $a$ of these relays 106 are all in series with each other and either of the direction relays 77 and 78 so that the energization of relays 77 and 78 and the consequent movement of the circuitous elevator unit cannot be effected until all the contact members $a$ are closed.

It can readily be understood that an additional safety feature is imparted to the circuitous elevator unit by the use of these interlocking hatchway and elevator cage door switches and that is that if any hatchway door or elevator cage door is opened during movement of the elevator unit that the unit will be immediately stopped and the brakes set on the driving motor EM.

The indicating panelboard 98 is also provided with electric indicating lamps 97 one for each of the relays 106 and each connected across the lines L1 and L2 in series with normally open contact members $b$ of the corresponding relay 106 so that the indicating lamps 97 are illuminated only when the relay 106 associated therewith is actuated to a closed position by the complete closing of both the hatchway door and the elevator cage door switches for a particular floor and in a particular hatchway. Obviously, when all the hatchway doors and all the elevator cage doors are closed all the lamps 97 will be illuminated. Each of these lamps 97 has a characteristic designation on it which identifies the position of the doors which control the operation of the relay 106 effecting its illumination. That is, the lamp whose illumination is effected by the closing of the hatchway door and elevator cage door switches at the first floor in the hatchway in which the cages move in a down direction has the designation 1D on it. Similarly, other floor and hatchway positions are designated by the characters 2D, 3D, 4D, 1U, 2U, etc.

Supplementing the indication of the lamps 97, a master indicating lamp IL is provided on the indicating panelboard 98. This lamp IL is so connected that it will be connected across the line L1 and L2 when all the contact members $a$ of the relays 106 are closed and therefore illuminated only when that occurs. The circuit for the lamp IL extends from line L1 through conductor 112, through all of the contact members $a$ of the relays 106 in series relation, through conductor 115, through the filament of the lamp IL to the terminal point 108 and thence to line L2.

As previously mentioned, each of the elevator cages is provided with a levelling motor 46 which effects exact alinement of the floor of elevator cage and the floor of the building at which that cage stops. Referring to Fig. 9, it will be seen that each of the motors 46 is a split-field motor having the two field windings 99 and 99′ wound in opposite directions so that when one field winding is energized the levelling motor rotates in one direction and when the other field winding is energized, the motor rotates in the opposite direction. The energization of each motor 46 is effected by means of brush arms or contact fingers 103 and 104 resiliently mounted upon the wall of the hatchway to engage the conducting strips 100 (or 101) and 102, respectively on the corresponding cage on which the motor is mounted. In the illustration shown in Fig. 9, these resilient brush arms 103 and 104 may or may not have a fixed position, since they engage successive cages. In a circuitous elevator unit where the cages travel a distance of a plurality of floors between successive stops, an additional control means is necessary to retract the brush arms 103 and 104 from engagement with the segments 100 (or 101) and 102, respectively, since it is not desirable nor necessary that the levelling motor function, as an elevator cage moves past a floor. Obviously, it is necessary that the levelling motor operate only at a time when a particular cage has stopped at a floor. I have not shown any means for retracting the brush arms 103 and 104, but it should be understood that a means such as a magnet coil actuable upon the stopping of the elevator unit to extend or allow the brush arms 103 and 104 to extend to an associative position with respect to the strip segments 100 (or 101), and 102, respectively, may be used. Such a retracting magnet is shown in Patent 1,580,363 to M. Baruch, and the application of F. E. Lewis, Serial No. 398,898, filed October 11, 1929 and assigned to the Westinghouse Electric and Manufacturing Company. The operation of the control system, as illustrated in Fig. 9, may best be understood by an assumed operation. It should be understood that an operator stationed at either of the terminal floors of the elevator unit or at some convenient point adjacent the elevator unit operates and controls the movement of the elevator unit. Let us assume that the elevator unit is at rest, and passengers have entered the various cages to ascend or descend from any of the floors to any of the others. The hatchway doors and the elevator cage doors are closed manually either by one of the passengers or by an attendant on each cage, or by an attendant on each floor, or by some system of automatic control known in the reciprocating elevator art. After all the hatchway doors and the elevator cage doors are closed, the control system is in a condition such that when the operator presses the starting button ST, the elevator unit will be set in motion.

Referring to Fig. 10, it will be seen that the coil 105 for each of the relays 106 is energized through the hatchway door switch 109 and the elevator door switch 110 located at the floor to which the individual relays correspond. The circuit for each of the relays 106 extends from line L2 through conductor 107 to the terminal point 108 located on the indicating panelboard 98 from whence it divides going in parallel through the various relay coils 105 and the hatchway switches 109 and the elevator door switches 110 in series with the particular relay coils 105 corresponding thereto, reuniting again on the other side of the switches 110 to go to the line L1 by conductor 111. The energization of the relay coils 105 closes the normally open contact members $a$ and $b$ of the relays 106. The contact members $a$ of the relays 106 close the circuit from line L1 to one terminal of the push button starting switch ST through conductors 112 and 113. As before noted, the contact members $b$ of each relay 106 maintains open the circuit through the indicating lamp 97 corresponding to its relay 106 when that relay is deenergized, so, therefore, under these conditions the indicating lamp 97 controlled thereby remains dark indicative of the open condition of the elevator door or the elevator cage door. Obviously, therefore, an attendant or operator can very easily determine the particular hatchway door or elevator cage door which is left open. Since the two switches 109 and 110 for each floor and hatchway are in series, an open condition of either a hatchway door or an elevator cage door causes the corresponding lamp 97 on the indicating panel 98 to remain dark. Should all of the hatchway doors and elevator cage doors be properly closed, obviously all of the lamps 97 will be illuminated indicating to the operator or attendant that the elevator unit is in a safe condition for movement.

Let us assume now that the operator has received the indication that the elevator unit is in a condition for movement, by observing the fact that all of the indicating lamps 97 on the panelboard 98 are illuminated as well as the master lamp IL. He then presses the starting push button ST which closes the circuit through the coil 92 of the relay 77, the circuit for which is as follows: (refer to Fig. 9). From line L1 through conductor 112, all of the contact members $a$ of relays 106 on panel 98, through conductor 113, starting push button switch ST, conductor 114, conductor 116, coil 92 of the relay 77, conductor 117, normally closed contact members $f$ of the reversing direction relay 78, conductor 118 and conductor 119 to the line L2. The closing of this circuit energizes the coil 92 to close the normally open contact members $a$, $b$, $c$, $d$ and $e$ of the relay 77 and open that relay's normally closed contact members $f$, $g$, $h$ and $i$. When the normally open contact members $d$ of the relay 77 close, a holding circuit is established through the floor selector FS to the coil 92 of the relay 77 which circuit is as follows: From line L1 through conductor 112, all of the contact members $a$ of the relays 106 in series, conductor 113, to one terminal of the starting switch ST, thence by conductor 120 to one terminal of the reversing push button switch RE, thence by conductors 121 and 122 to the brush 123, which engages the continuous ring 94 on the selector switch FS, through ring 94 and thence through the connecting conductors 94' and 89' to the segment 89 in engagement with the brush 124, thence through the segment 89 and brush 124, through conductor 125, the emergency stop push button switch ES, conductors 126 and 127, contact members $d$ of the relay 77, conductor 128 and conductor 116 through coil 92 of the relay 77 and subsequently to the line L2 through the normally closed contact members $f$ of the relay 78, as previously traced.

The emergency stop switch ES is provided so that the circuit through the relay coil 92 may be broken at any time by the attendant who operates the starting push button switch ST and the reverse push button switch RE, and it is suitably located adjacent to them.

At the instant of starting, the brush 124 is actually in engagement with a non-conducting segment 90 but the starting switch ST is held in long enough by the operator so that the movement of the elevator motor EM rotates the drum of the selector switch FS to such an extent that the brush 124 engages the particular conducting segment 89 which is immediately adjacent thereto in the direction of rotation. Thus, after the contact is once established between the brush 124 and the segment 89, the starting push button switch ST may be released by the operator and the circuit through the coil 92 of the relay 77 is maintained through the circuit previously traced.

The closing of the contact members $a$ and $b$ of the relay 77 closes the circuit through the field winding GF of the generator G, as follows: From line L1 through conductor 129, contact members $a$ of the relay 77, conductor 130, conductor 131, field winding GF, conductor 132, resistor R, conductor 133, conductor 134, contact members $b$ of the relay 77, conductor 135 to the line L2. The closing of this circuit causes the field in the generator G to build up and consequently voltage to develop at the terminals of generator G which causes current to flow through the armature E'M' of the elevator motor EM in such a direction that the shaft of the motor EM is rotated in a direction to cause a movement of the circuitous elevator unit so that the cages move in a direction corresponding to the normal indication of their travel at the respective floors. In the illustration of Fig. 9, this would mean that the elevator unit would move in a counterclockwise direction.

Since the resistor R is included in the circuit of the generator field GF, the energizing current is kept at a value such as to cause the generator G to supply a voltage to the elevator motor EM for a slow-speed movement of the cages.

The closing of the contact members $c$ of the relay 77 closes an energizing circuit through the brake coil 146 which circuit is as follows: From the line L2 through conductors 147 and 148, contact members $c$ of the relay 77, conductors 149 and 149', brake coil 146, conductors 142 and 121 to the terminal of the reversing push button switch RE connected to the line L1, as previously traced. The energization of the brake coil 146 releases the brake previously set so that the motor EM is free to rotate.

After the circuitous elevator unit has moved at this slower speed for a small distance depending upon the distance required to attain a gradual acceleration, the drum of the selector FS has rotated a sufficient amount so that the brush 91 engages the conducting segment 95 next adjacent thereto in the direction of rotation. The engagement of the brush 91 and the segment 95 closes the energizing circuit through the coil 136 of the high speed relay HS which circuit is as follows: From the line L2 through conductor 137, coil 136 of the high-speed relay HS, conductor 138, conductor 139, normally open contact members $e$ of the direction relay 77, conductor 140, conductor 141, brush 91, a segment 95, on the floor selector FS, conductors 95' and 90' connecting this segment with the collector ring 94, through the collector ring 94, brush 123, conductors 122 and 121 to the side of the reversing push button switch RE connected to the line L1, as previously traced.

The energization of the coil 136 closes the contact members $a$ of the high-speed relay HS which shunt the resistor R. The shunting of the resistor R causes the amount of current flowing through the generator field GF to be increased resulting in the increasing of the voltage generated by the generator G and supplied to the armature E'M' of the elevator motor EM which results in a high-speed movement of the circuitous elevator unit.

The circuitous elevator unit continues to move at this higher speed until the brush 91 leaves the segment 95, with which it has been in engagement and thus opens the energizing circuit through the coil 136 of the high-speed relay HS resulting in the contact members $a$ of that relay opening, removing the shunt from the resistor R. The re-insertion of the resistor R in series with the generator field GF reduces the current through that field to its former low value, so that the voltage generated by the generator G and supplied to the armature E'M' of the elevator motor EM, is again returned to its lower value causing the elevator motor to drive the circuitous elevator unit at its former slow speed.

The elevator unit continues to move at this slower speed until the brush 124 leaves the segment 89 with which it has been in engagement. When this occurs, the holding circuit through the coil 92 of the direction relay 77 is opened and the relay 77 is deenergized. The opening of the contact members $a$ and $b$ of relay 77 opens the energizing circuit through the generator field GF causing the voltage generated by the generator G to be reduced practically to zero.

The closing of the contact members $i$ of the direction relay 77 closes a circuit through the generator auxiliary field GAF, which circuit is as follows: From the line LL1 of the generator G through the generator auxiliary field GAF, conductor 143, contact members $i$ of the relay 77, conductor 144, contact members $i$ of the relay 78, conductor 145 to the line LL2 of the generator G. The energization of the auxiliary field GAF opposes the residual magnetism of the generator G, and the voltage of the generator G is reduced to exact zero.

Immediately upon the deenergization of the coil 92 of the relay 77, the contact members $c$ of the relay 77 open, thus opening the energizing circuit through the brake coil 146 previously held closed when the relay 77 was in its closed position. The deenergization of the brake coil 146 causes the brake to be re-set by operation of its actuating spring (not shown).

It might be possible that the stopping of each of the cages would be so effected that they would be in exact alinement with the respective floors at which they stop. However, in actual operation, it is very improbable that this would occur due to the variable loading of the cages and the resulting fact that the distance which the cages move between the time at which the elevator motor is deenergized and the time at which they come to a complete stop is variable.

Let us suppose that the circuitous elevator unit has been completely stopped in such a position that all of the cages are below the floors at which they are respectively stopped. Each of the cages is leveled by means of its associated levelling motor 46. As previously stated, the motor 46 is a split-field motor having the winding 99 wound in one direction and the winding 99' wound in the opposite direction. If, as we have assumed, the cages stopped below the level of the floors, then the brush or contact finger 103 engages the conducting strip 100 and the brush 104 engages the conducting strip 102. The motor 46 for each cage is then energized through the field winding 99 to cause the motor to rotate in such a direction as to move its cage 38 upward with respect to its supporting frame comprising members 33, 33', 34 and 34', previously described, until the floor of the cage 38 is in exact alinement with the floor of the building and this occurs when the brush 103 engages the non-conducting portion between the conducting strips 100 and 101. The energizing circuit for the motors 46 in this case is as follows: From line L1 through conductor 150, contact members $g$ of the relay 78, conductor 151, contact members $g$ of the relay 77, conductor 152 to the point 153, whence it divides going in parallel paths through each of the brushes 103 in engagement with the conducting strip 100 on its associated elevator cage, through the conducting strip 100, through the winding 99 and armature winding 46' of the leveling motor 46, through the conducting strip 102, through the brush 104 to the point 154 at which point all of the parallel paths are re-united to go by conductor 155, contact members $h$ of the relay 77, conductor 156, contact members $h$ of the relay 78 and conductor 157 to the line L2. The motors 46 rotate in such a direction as to move their separate cages upward with respect to the supporting frames until each brush 103 leaves the conducting strip 100 with which it has been engaged, at which time the energizing circuit through the motors 46 is broken and the elevator cages are stopped in a position in which they are exactly alined with the floors of the building at which they stop.

If the elevator cages stop above the floors of the building at which they stopped upon deenergization of the motor EM, each brush 103 engages the conducting strip 101 on the cage associated therewith, thus establishing an energizing circuit through the armature windings 46' and the field windings 99' of the motors 46, causing the motors to rotate in such direction as to lower the cages with respect to the supporting frames and bringing the floors of the respective cages into alinement with the building floors when the brush 103 engages the non-conducting segment between the conducting strips 100 and 101. The energizing circuit for the motors 46 is the same as previously described for the engagement of the brush 103 with the strip 100, except that the circuit extends from the brush 103 through conducting strip 101 and field winding 99', thence through the armature winding 46' of the motor 46 to the line L2 as previously traced.

Ordinarily, for normal operation, the circuitous elevator unit will rotate in one direction only, but it is desirable that, in an emergency, the system be provided with a control means for allowing movement in the opposite direction. The reversing direction relay 78 is, therefore, provided to effect this reversal of direction. For purposes of explanation, the operation of the elevator unit in a direction reverse of the normal direction of movement is best understood by an assumed operation. The operator presses the reversing push button switch RE which closes the energizing circuit through the coil 93 of the direction relay 78 which circuit is as follows: From line L1 through conductor 112, contact members $a$ of relays 106 on the indicating panelboard 98, conductor 113 to one terminal of the starting switch ST, conductor 120, through the contact members of the reversing push button switch RE, conductors 158 and 158', coil 93, of the reversing relay 78, conductor 159, normally closed contact members $f$ of the relay 77, conductor 160 and conductor 119 to the line L2. A holding circuit through the selector switch FS and the contact members $d$ of the relay 78 is established in a manner similar to that described for the relay 77. The circuit is as follows: From the terminal of the reversing push button switch RE connected to the line L1, as previously traced, through conductors 121 and 122, brush 123, collector ring 94, the conductors 94' and 89' connecting the collector ring 94 and the segment 89 next in direction of rotation, that segment 89, brush 124, conductor 125, emergency stop push button switch ES, conductor 126, conductor 161, contact members $d$ of the relay 78, conductor 170, coil 93 of the relay 78 to the line L2, as previously traced.

The closing of the contact members $a$ and $b$ of the relay 78 closes the energizing circuit through the generator field GF but in such a way that the current flows through the field in a direction opposite to that when the circuit is closed through the contact members $a$ and $b$ of the relay 77 which results in a reversal of motor EM. The circuit is as follows: From line L1, through conductor 165, contact members $a$ of the relay 78, conductors 166 and 133, resistor R, conductor 132, generator field GF, conductors 131 and 167, contact members $b$ of the relay 78, and conductor 168 to line L2.

The energization of the brake coil 146 is effected by the closing of the contact members $c$ of the relay 78. This circuit is as follows: From the terminal of the reversing push button switch RE connected to the line L1, as previously traced, through the conductors 121 and 142, through brake coil 146, conductor 149', conductor 162, contact members $c$ of the relay 78, conductor 163 and conductor 147 to the line L2.

The contact members $e$ of the relay 78 are connected in parallel with the contact members $e$ of the relay 77, and, therefore, perform the same function as contact members $e$ of the relay 77, namely, to close the energizing circuit through coil 136 of high speed relay HS.

Obviously, therefore, the circuitous elevator unit will move in a clockwise direction upon the operation of the reversing push button switch RE.

The operation of the levelling motors 46 on each cage is unaffected by the direction of movement of the elevator unit.

From the foregoing description, the mechanical operation of one type of a circuitous elevator and a control system, therefore, will be understood. However, in order to understand the operation of my invention as a whole, a few hypothetical illustrations may be given. It should be understood that my invention includes a completely operative passenger circuitous elevator system for any type of building, such as an office building, department store, hotel, apartment house, etc.

It will have been understood that elevator unit 1 in Fig. 1 constitutes an express elevator, that is, an elevator moving at not necessarily a higher speed than the other elevators, but moving greater distances between successive stops. The units 2, 3, 4 and 5, it will be understood, constitute local elevators, that is, elevators in which the cages stop at every floor past which they move.

Referring again to Fig. 1, let us assume that a number of passengers on the first floor F1 desire to descend to the basement floor and a number of passengers on the basement floor B desire to ascend to the first floor F1. The passengers on the first floor enter the cage of unit 5 at that level which is in the down direction path, this path being properly indicated by some means, for example a light or legend on the outside of the hatchway walls, and the persons at the basement floor enter the cage at that level which is in the up direction path of the circuitous elevator unit, this path being also properly indicated to the passengers. After all the passengers are safely inside the cages, an attendant on the first floor and an attendant at the basement floor close the elevator cage doors and the hatchway doors for their respective floors and the elevator unit is in a condition for movement. Since it is desirable that the control push button for the units be located on the first floor, the task of controlling the movement of the unit will devolve upon the attendant at that floor. After all elevator cage doors and hatchway doors have been closed, the attendant at the first floor F1 receives the information that they are all closed by an examination of the indicating panelboard 98, which will show all of the signal lights lighted, as well as the master light IL. Then he pushes the push-button starting switch ST and the circuitous elevator unit moves automatically through the cycle similar to that previously described for Fig. 9 and is automatically stopped, and the cages levelled after moving but one floor distance. The attendants at the respective floors then open the elevator cage doors and the hatchway doors corresponding thereto and the passengers leave their respective cages. When the circuitous elevator unit is in this position, it will be readily appreciated that the other cages may be loaded at the floor F1 and at the basement floor, as previously described, at the same time that the passengers are leaving their respective cages at the first floor and basement floor to which they have ascended and descended, respectively. It will thus be seen that there are four streams of traffic all separate from each other entering and leaving the elevator unit simultaneously. After the passengers have all either left the cages or entered their respective cages, the elevator cage doors and the hatchway doors are again closed by the attendants and the unit moved again as before by operation of the starting push button ST by the attendant at the first floor F1.

The advantage of a circuitous elevator unit is that all the passengers will be moving in a single direction, either into a cage or out of a cage, and clearly no confusion can result as in reciprocating elevator systems where passengers enter and leave a single cage at the same time.

Let us assume another hypothetical case in which a particular passenger on the first floor F1 desires to go to the fourth floor F4 at the same time that a passenger on the third floor F3 desires to descend to the first floor F1. The passenger at the first floor goes to the up-direction cage of unit 3 at the first floor level and enters at the same time that the passenger on the third floor enters the down-direction cage at the third floor level. After these two passengers have entered their respective cages, the elevator cage doors are closed and the corresponding hatchway doors are closed, and the attendant at the first floor F1 receiving the signal indication on the indicating panelboard, similar to 98, pushes the starting push button switch controlling the unit 3, and the elevator unit moves through a distance of one floor, as previously explained, and automatically stops and levels the cages with the respective floors. Any other passengers desiring to enter or leave any of the cages do so, and the elevator cage doors and hatchway doors are again closed, this occurring at regular intervals of elevator unit movement of one floor distance. It will be readily seen then that the passenger descending from the third floor F3 will reach the first floor with an intermediate stop at the second floor F2 and the passenger ascending to the fourth floor F4 will reach the fourth floor with two intermediate stops at the second floor F2 and the third floor F3.

Each of the units 2 and 4 are operated in a similar manner past the floors with which they are associated.

Now let us assume a passenger desiring to ascend to the twelfth floor F12 from the first floor F1. He enters the up-direction cage of unit 1, and after operation of the elevator unit, as previously explained, he reaches the ninth floor F9, having stopped intermediately at the fifth floor F5. He leaves the cage of unit 1, in which he was, walks to the adjacent unit 2 and either enters a particular up-direction cage of that unit, if there is one available, or waits until one arrives and the elevator cage door and hatchway door are opened. The time he is required to wait is practically negligible since there is a cage but one floor distance away at the most. He then rises to the twelfth floor by successive intermediate stops at the tenth floor F10 and the eleventh floor F11.

Another case might be assumed in which a passenger desires to descend to the first floor F1 from the twelfth floor F12. This passenger enters the down-direction cage of unit 2, at the level of the floor F12, descends to the ninth floor F9 by successive intermediate stops at the eleventh floor F11 and the tenth floor F10, leaves the cage of unit 2, walks to the adjacent unit 1 and enters the down-direction cage of that unit at that level, and subsequently descends to the first floor with one intermediate stop at the fifth floor F5.

Other hypothetical cases might be assumed to explain the operation of my invention, but it is thought that the cases assumed, clearly and sufficiently illustrate its operation.

A modification of the system shown in Fig. 9 is illustrated in Fig. 11, wherein is shown a control system for a circuitous elevator unit in which the movement of the unit is automatically initiated upon the closing of all hatchway and cage doors without the necessity of operating an additional starting push button as in Fig. 9.

Most of the elements shown in Fig. 9 are repeated in Fig. 11 and the circuits connecting these various elements are essentially the same as shown for Fig. 9. Therefore, detailed description of the entire system shown in Fig. 11 will not be given but it should be understood that the various elements function in the same manner as do the corresponding elements in Fig. 9.

Essentially, the modification over the system shown in Fig. 9 consists in the addition of two collector or commutator rings on the selector switch FS, an additional relay 176 and the substitution of a single reversing push button switch Rev for the starting push button ST and reversing push button RE of Fig. 9, with the necessary connections for including these elements in the control circuit of Fig. 9.

The reversing push button switch Rev is of the ordinary type and has two contact members $a$ and $b$ which are mechanically interlocked, so that they cannot simultaneously engage the respective contact terminals with which they cooperate, to constitute a switch. In Fig. 11, the contact member $a$ of the reversing push button switch Rev is normally in engagement with its contact terminals so that a closed circuit is maintained through the reversing switch to the coil 92 of the direction relay 77. When it is desired to operate the elevator unit in a reverse direction, the pressing of the push button causes contact member $a$ to disengage its contact terminals and contact member $b$ to engage its contact terminals and close the circuit through the push button switch Rev to the coil 93 of the reversing relay 78. The time of engagement of the contact member $b$ with its cooperating contact terminals need only be a momentary one, since once the reversing relay 78 has picked up, the contact member $a$ may again engage its contact terminals without energizing the coil 92 of the relay 77, since the energizing circuit through that coil is opened due to the fact that the contact members $f$ on the reversing relay 78 are open. Therefore, the switch Rev can well be the type of switch to use rather than a snap switch which might also be used.

No time delay means has been included in the control system of Fig. 11 to delay the operation of either relay 77 or 78 when the other is deenergized but it is appreciated that any of the methods in common use today could be adapted to this system. Such a time delay would be necessary as a safety feature to prevent exceptional stresses in driving gear mechanisms due to rapid reversal of direction of movement of the elevator unit, as when with the unit moving in one direction, push button Rev is suddenly pressed to the reversing position.

One of the collector or commutator rings which is added to the selector switch FS comprises conducting segments 171 separated by non-conducting segments 172 both being mounted on the drum surface of the selector switch FS in a manner similar to that described for segments 89 and 90 of Fig. 9. All the segments 171 are interconnected by conductors 171' and all are connected by conductor 172' to the other ring 173 which is added and which comprises a continuous conducting ring similar to the ring 94 and is insulated from the drum of the selector switch FS. A contact finger or brush 174 engages the collector or commutator ring comprising the segments 171 and 172 and a contact finger or brush 175 engages the ring 173.

The relay 176 comprises two coils, one a pick-up coil 177 and the other a holding coil 178, and a single contact member $a$ associated with two contact terminals to close a single circuit. The pick-up coil 177 has a sufficient number of turns so that upon energization it has sufficient magnetic strength to lift the plunger and open the circuit normally closed by the contact member $a$. The holding coil 178 does not have a sufficient number of turns to pick up the relay 176 from its normally deenergized position in which the contact member $a$ engages its contact terminals, but it does have a sufficient number of turns, so that once the relay has been picked up by the coil 177, it will maintain the relay in a picked-up position.

The purpose of the addition of the two collector or commutator rings to the selector switch FS and the relay 176 and their functions can best be brought out by an assumed operation.

Let us assume that all of the hatchway and cage doors have been closed after the passengers have either left or entered their respective cages. The hatchway door switches 109 and the elevator cage door switches 110 are then closed and the energizing circuits through all of the relay coils 105 are closed across lines L1 and L2, resulting in the closing of all the contact members $a$ of the relays 106 on the indicating panel 98 as well as the lighting of all indicating lamps 97 (not shown in Fig. 11) as previously described in Fig. 10. When all of the contact members $a$ of the relays 106 are closed, the energizing circuit through the coil 92 of the relay 77 is closed, which circuit is as follows: From line L1 through all of the contact members $a$ of the relays 106 in series to the point 179, thence through conductor 180, emergency stop push button switch ES, conductor 181 to the point 182, conductors 183 and 184, brush 175, collector ring 173, through the conductors 172' and 171' connecting the ring 173 to a segment 171 in engagement with the brush 174, through the segment 171, through the brush 174, conductor 185, the normally closed contact member $a$ of the relay 176, conductor 186, contact member $a$ of the reversing push button switch Rev, conductors 187 and 188 through coil 92 of the relay 77, conductor 189 through the normally closed contact members $f$ of the relay 78, conductors 190 and 191 to line L2.

In a manner similar to that described for Fig. 9, relay 77 picks up, the brake coil 146 being energized through contact members $c$ of the relay 77, the energizing circuit through the generator field GF being closed through the contact members $a$ and $b$ of the relay 77, the auxiliary field GAF of the generator G being deenergized by the opening of the contact members $g$ of the relay 77 and the opening of the contact members $h$ and $i$ on the relay 77 opening the circuit to the brushes 103 and 104 of the leveling mechanism.

Upon starting, it will be understood that brush 174 is in engagement with a segment 171 and that brush 124 is in engagement with a non-conducting segment 90 between two conducting segments 89 and that brush 91 is in engagement with a non-conducting segment 96 between two conducting segments 95. The conveyor unit now moves and upon a sufficient amount of rotation of the drum of the selector switch FS, the brush 124 engages the conducting segment 89 next in the direction of rotation, there being an instant in which the brush 174 is simultaneously in engagement with its corresponding conducting segment 171 at the time that the brush 124 engages its corresponding conducting segment 89 next in the direction of rotation. This is necessary because of the fact that the holding circuit for the coil 92 (and also coil 93 of the relay 78 for reverse operation) is maintained through the contact formed by the engagement of brush 124 with a segment 89, so, therefore, the coil 92 (or 93) must be energized until the brush 124 engages the segment 89 next in direction of rotation. For this reason, the length of the conducting segments 171 is about the same as the length of the non-conducting segments 90.

When brush 124 engages the segment 89 next in direction of rotation, it closes the energizing circuit through the pick-up coil 177 of the relay 176, which circuit is identical with that already traced to the point 182 from the line L1 and thence it goes by conductors 183 and 183' through the brush 123 and the collector ring 94 which it engages, through the conductors 90' and 95' connecting the collector ring 94 with the segment 89, through the segment 89, through brush 124, through conductor 192 to the point 193, thence by conductor 194, through coil 177 of the relay 176, conductors 195 and 196 to the line L2. The relay 176 then picks up, opening the circuit closed by its normally closed contact member $a$, but the energizing circuit through the coil 92 of the relay 77 is not opened thereby because it is maintained through the segment 89 and brush 124 to the point 193, as previously traced, thence by conductor 197 and 198, contact members $d$ of the relay 77, conductors 199 and 188, coil 92 of the relay 77, conductor 189, contact members $f$ of the reversing relay 78 and conductors 190 and 191 to the line L2. The elevator unit continues to move at the slow speed determined by the amount of current flowing through the field GF of the generator G with resistor R in series therewith until the brush 91 engages the segment 95 on the selector switch FS next in direction of rotation.

This engagement of the brush 91 and the segment 95 effects the energization of the coil 136 of the high speed relay HS exactly in the manner described for Fig. 9 and results in subsequent shunting of the resistor R and movement of the elevator unit at high speed.

When the brush 91 leaves the segment 95 with which it has been in engagement, the resistor R is re-inserted in the circuit of the generator field GF and the elevator unit moves at the slow speed again until the brush 124 leaves the conducting segment 89 with which it has been in engagement.

When this occurs, the brush 174 has reengaged a segment 171, but the energizing circuit through the coil 92 (or 93) is not maintained through the contact member $a$ of the relay 176, because even though the pick-up coil 177 of the relay 176 has been deenergized by the opening of the circuit through the brush 124 and the segment 89 which it engaged, nevertheless, the energizing circuit through the holding coil 178 of the relay 176 is maintained and, as previously mentioned, this holding coil 178 has sufficient strength to maintain the relay 176 in a picked-up position after it has once been picked up and, therefore, the circuit through the contact member $a$ is open. The energizing circuit for the holding coil 178 of relay 176 extends from point 182 connected to line L1 as previously traced, through conductor 203, through coil 178 of relay 176 and conductors 204 and 196 to line L2.

Thus, the elevator unit will stop when the brush 124 runs off the segment 89 with which it has been in engagement and the stopping will occur at such time and in such manner that the successive cages will be substantially at the level of the floors at which they have stopped.

Levelling of the elevator cages is effected in the same manner and by the same mechanism as that described for Fig. 9.

After the cages are exactly on a level with their respective floors, the elevator cage doors and the hatchway doors are opened (either by attendants on each cage or by attendants on each floor, or automatically by any of the commonly known mechanisms in use on reciprocating elevators) and the passengers leave or enter the cages as they so desire.

The opening of the hatchway doors and the elevator cage doors opens the corresponding contact members $a$ of relays 106 on the indicating panelboard 98 and, therefore, the energizing circuit through the holding coil 178 of the relay 176 is opened, and the relay 176 returns to its deenergized position in which a circuit is maintained through the contact member $a$ of the relay 176. However, since the energizing circuit through the coil 92, as first traced, is maintained open by the fact that the contact members $a$ of the relays 106 are open, the elevator unit cannot again start to move until all the hatchway and cage doors are closed.

For reverse movement of the circuitous elevator unit, the attendant presses the reversing push button switch Rev after all the hatchway and elevator cage doors are closed. The reversal of direction of movement of the elevator unit is effected by the closing of the contact members $a$ and $b$ of the relay 78 and the establishment of a flow of current through the field GF of the generator G in an opposite direction to the normal direction as established by the contact members $a$ and $b$ of the relay 77. The actuation of the relay 78 to a picked up position is effected by the energization of coil 93 of the relay 78 through a circuit which includes the contact member $b$ of the reversing push button switch Rev and which is as follows: From line L1 to the terminal of the reversing push button switch Rev as previously traced for the coil 92 of the relay 77, thence through the contact member $b$ of the reversing push button switch Rev, conductor 200, coil 93 of the relay 78, conductor 201, normally closed contact members $f$ of the relay 77, conductor 202 and conductor 191 to line L2. The operation of the selector switch FS and the relay 176 is unaffected by the fact that the coil 93 of the relay 78 is energized instead of the coil 92 of the relay 77.

Thus, it will be seen in this modification of Fig. 9 that the circuitous elevator unit is automatically started by the closing of all of the hatchway and cage doors and automatically moved a definite distance and stopped, (in Fig. 11, it is shown as a distance between successive floors, but it should be understood that the distance between successive stops may be that between a plurality of floors), automatic acceleration and deceleration of the elevator unit is effected between stops, automatic levelling of individual cages is effected when the elevator unit stops, and subsequent movement of the elevator unit is prevented, after it has once stopped, until any hatchway door or elevator cage door is opened and reclosed.

In certain cases it might be desirable to have an installation comprising a combination of reciprocating type elevators and circuitous type elevators instead of all circuitous type elevators. In Fig. 12 there is illustrated a modification of Fig. 1, in which a reciprocating elevator unit 1′ is substituted for the circuitous elevator unit 1 of Fig. 1. The circuitous elevator units 2′, 3′, 4′ and 5′ correspond to and operate similarly to units 2, 3, 4 and 5, respectively, of Fig. 1.

I have represented the reciprocating elevator unit as comprising a single cage 12′ suspended from a cable 13′ which passes around a supporting drum 15, (which drum is motor driven) and is attached to a counterweight CW which reciprocates in guide rails as does the elevator cage 12′ itself, although guide rails are not shown in Fig. 12, for the purpose of clarity.

The advantages of using a reciprocating elevator for the express service over that of the circuitous type elevator is that a combination express and local service may be effected which is not possible when the circuitous type elevator is used, that is, the elevator cage 12′ may operate under express service to upper floors of the building and, subsequently, operate under local service for the upper floors of the building.

The operation of an elevator system, such as shown in Fig. 12, is effected similarly to that described for Fig. 11, so that such description of operation will not be repeated here.

It will thus be seen that my invention comprises the adaptation of circuitous or continuous type elevators to buildings such as office buildings, department stores, hotels, apartment houses, etc., for mass transportation of passengers. It will have been understood that my invention comprises a practical and commercially operable circuitous elevator system for passenger service; and furthermore that I have disclosed an electric control system for initiating the starting of a circuitous elevator unit either by push button means or automatically upon the closing of all cage and hatchway doors, for automatically controlling the distance of movement of the elevator unit between successive stops and stopping it, for automatically accelerating and decelerating the unit between successive stops, and for automatically levelling the separate cages by individual movement thereof.

It will be understood that diagrams and drawings included herein are intended to be illustrative only of the fundamental principle of my invention and that other modifications thereof may be effected without departing from the spirit and scope of my invention. I desire therefore, that only such limitations be imposed as are indicated in the appended claims.

I claim as my invention:

1. In combination, means defining two adjacent hatchways, a plurality of cages movable in succession through the hatchways in a circuitous path, means for moving said cages, and means disposed at the extremities of the hatchways and movable in accordance with the movement of the cages for guiding said cages during their movement between hatchways, said guiding means comprising adjustable means for engaging and releasing said cages, and means for adjusting said cage engaging and releasing means while said cages are moving.

2. In combination, means defining two adjacent hatchways, a plurality of cages movable in succession through said hatchways in a circuitous path, means for moving said cages, and means disposed at the extremities of the hatchways and movable in accordance with the movement of the cages for guiding said cages during their movement between hatchways, said guiding means comprising a plurality of rotatable arms and adjustable means on each thereof for engaging and releasing said cages, and means for effecting the adjustment of said adjustable means while said cages are moving.

3. In combination, means defining two adjacent hatchways, a plurality of cages disposed in spaced relation and movable in succession through said hatchways in a circuitous path, means for moving said cages, and means for guiding said cages to maintain a substantially vertical orientation thereof during their movement between hatchways, said guiding means comprising a plurality of radially extending arms disposed at the extremities of the hatchways for rotation in accordance with the movement of said cages, adjustable means on each of said arms for engaging and releasing said cages, and means including stationary cam means for effecting the adjustment of said adjustable means while said cages are moving.

4. In combination, a building, a plurality of floors therein, said floors being arranged in a plurality of successive groups, a circuitous elevator unit for each group of floors having cages movable past the floors of that group whereby a continuous elevator communication is established between successive floors throughout the height of the said building, and an additional circuitous elevator unit having cages movable past all of said floors in said building, the last mentioned cages being spaced apart a distance equal to the distance between two floors remotely spaced.

5. In combination, a building, a plurality of floors therein arranged in successive groups, a circuitous elevator unit for each group of floors having a plurality of cages movable past the floors of its associated group of floors, the cages being spaced apart a distance equal to the distance between successive floors whereby there are always pairs of cages of the same circuitous elevator unit at the same floor level for any normal stopping position of the elevator unit, and an additional circuitous elevator unit having a plurality of cages movable past all of the floors in said building, the cages of said latter unit being spaced apart a distance equal to the distance between two floors remotely spaced, and pairs of the cages being simultaneously at the same level for normal stopping positions of the unit.

6. In a circuitous elevator having a plurality of spaced cages movable in succession in an endless path, motive means for moving the cages through the endless path, and control means for said motive means including means movable in accordance with the movement of the cages for effecting the actuation of said motive means to cause it to move said cages over a plurality of successive predetermined distances corresponding to the distance between adjacent cages and automatically stop them after traversing each predetermined distance.

7. The combination in a building having a plurality of floors and a hatchway extending past said floors, of a plurality of cages spaced apart a distance corresponding to that between successive floors and movable in a circuitous path in said hatchway successively past said floors, motive means for moving the cages through the circuitous path, and control means for said motive means including means movable in accordance with the movement of the cages for effecting the actuation of said motive means to cause it to move said cages over a plurality of successive distances each corresponding to the distance between successive floors and to automatically stop the cages substantially at the level of respective floors after traversing each of the distances.

8. In combination, a building, a plurality of floors therein, means defining two adjacent vertical hatchways in said building, a plurality of passenger elevator cages movable in a circuitous path past said floors, means for supporting said cages, motive means for moving said cages successively through the two adjacent vertical hatchways in a circuitous path past said floors, doors for each of said hatchways at each of said floors for entrance to said cages from the respective floors and exit from said cages to floors at which said cages are stopped, control means for said motive means including a switch means operable by said hatchway doors to initiate starting movement of said motive means when all of said hatchway doors are closed, and means movable in accordance with the movement of said cages for maintaining movement of said motive means and controlling it to cause it to move said cages a predetermined distance and then automatically stop them substantially at the level of floors.

9. In combination, a building, a plurality of floors therein, means defining two adjacent vertical hatchways in said building, a plurality of passenger elevator cages movable in a circuitous path successively through the two adjacent vertical hatchways past said plurality of floors, means for supporting said cages, motive means for moving said cages successively through the two adjacent vertical hatchways in a circuitous path past said floors, control means for said motive means comprising means movable in correspondence with the movement of said cages to automatically cause acceleration of said motive means from zero speed to a maximum speed and deceleration of said motive means from the maximum speed to zero speed.

10. In combination, a building, a plurality of floors therein, means defining two adjacent vertical hatchways in said building, a plurality of passenger elevator cages movable in a circuitous path successively through the two adjacent vertical hatchways past said plurality of floors, means for supporting said cages, motive means for moving said cages successively through the two adjacent vertical hatchways in a circuitous path past said floors, control means for said motive means comprising a manually operable switch means for initiating starting movement of said motive means, means movable in correspondence with the movement of said cages to automatically maintain movement of and cause acceleration of said motive means from zero speed to a maximum speed and deceleration thereof from the maximum speed to zero speed.

11. In combination, a building, a plurality of floors therein, means defining two adjacent vertical hatchways in said buildings, a plurality of passenger elevator cages movable in a circuitous path successively through the two adjacent vertical hatchways past said plurality of floors, means for supporting said cages, motive means for moving said cages successively, through the two adjacent vertical hatchways in a circuitous path past said floors, doors for each of said hatchways at each of said floors for entrance to said cages from the respective floors and exit from said cages to floors at which said cages are respectively stopped, doors on each cage for permitting entrance thereto and exit therefrom, control means for said motive means comprising switch means operable by said hatchway doors and said cage doors to initiate starting movement of said motive means when all of said hatchway and cage doors are closed, means movable in correspondence with the movement of said cages to automatically cause acceleration of said motive means from zero speed to a maximum speed and deceleration from the maximum speed to zero speed.

12. The combination in a building having a plurality of floors and a hatchway extending past the floors, of a plurality of spaced cages movable in succession in a circuitous path in the hatchway the cages being so spaced as to be simultaneously alignable with the various floors respectively, means including supporting means for said cages and motive means, for moving the cages through the hatchways, means including a motive means on each of said cages, each of said latter motive means being actuable from an external source of energy to separately adjust the position of its corresponding cage with respect to the said cage supporting means and to simultaneously level the cages with respect to the floors at which they are substantially stopped, and switch means comprising stationary means at each floor and means on each cage cooperable therewith when a cage is stopped substantially at a floor for automatically reversibly controlling simultaneously the actuation of all the said motive means on the cages, said switch means constituting the only means of connection between the said motive means on the cages and the stationary energy supplying source therefore.

13. In combination, a building, a plurality of floors therein, means defining two adjacent vertical hatchways in said building, a plurality of passenger elevator cages movable in a circuitous path successively through the two adjacent vertical hatchways in a circuitous path past said floors, means for supporting said cages, motive means for moving said cages successively through the two adjacent vertical hatchways in a continuous path past said floors, control means for said motive means comprising means movable in correspondence with the movement of said cages to automatically cause movement of said cages over a predetermined distance and then automatically stop them on a substantial level with respective floors, means for adjustably supporting said cages on said cage supporting means to allow movement of said cages with respect to said cage supporting means in opposite directions, motive means on each of said cages to effect movement of said cages with respect to said cage supporting means, switch means operable when said cages are stopped substantially on a level with the floors at which they stop to effect actuation of said motive means on each cage to move said cages with respect to the cage supporting means into a position on an exact level with the floors at which the respective cages have substantially stopped.

14. In combination, a building, a plurality of floors therein, means defining two adjacent vertical hatchways in said building, a plurality of passenger elevator cages movable in a circuitous path successively through the two adjacent vertical hatchways past said plurality of floors, means for supporting said cages, motive means for moving said cages successively through the two adjacent vertical hatchways in a circuitous path past said floors, control means for said motive means comprising means movable in correspondence with the movement of said cages to automatically cause acceleration of said motive means from zero speed to a maximum speed and deceleration from the maximum speed to zero speed, means for adjustably supporting said cages on said cage supporting means to allow movement of said cages with respect to said cage supporting means in opposite directions, motive means on each of said cages to effect movement of said cages with respect to said cage supporting means, switch means operable when said cages are stopped substantially on a level with the floors at which they stop to effect actuation of said motive means on each cage to move said cages with respect to the cage supporting means into a position on an exact level with the floors at which the respective cages have substantially stopped.

15. In combination, means defining two adjacent hatchways, a plurality of cages movable in succession through said hatchways in a circuitous path, means for moving said cages, and means for guiding said cages to maintain a substantially vertical orientation thereof during their movement between hatchways, said guiding means comprising a plurality of radially arranged arms disposed at the extremities of the hatchways and movable in accordance with the movement of said cages, adjustable means on each of said arms for engaging and releasing the cages and means for effecting an adjustment of said adjustable means to securely engage a cage at the beginning of its lateral movement from one hatchway to another, and for effecting an adjustment of said adjustable means at the completion of the lateral movement of a cage to release the cage.

16. In an elevator system, an elevator car, including a cage and a sling therefor, means for supporting and moving said car, means for adjustably supporting said cage in said sling including supporting struts for suspending said cage from said sling, said struts comprising two members pivotally attached at their ends, and means for changing the angular relation of the said two members comprising the struts to raise or lower the cage with respect to the said sling.

17. In an elevator system, an elevator car including a cage and a sling therefor, means for supporting and moving said car, means for adjustably supporting said cage in said sling including supporting struts for suspending said cage from said sling, said struts comprising two members pivotally attached at their ends, and means for changing the angular relation of the said two members comprising the struts to raise or lower the cage with respect to the said sling, said last mentioned means including motive means disposed on said cage.

18. In combination, a circuitous elevator, having a plurality of cages movable in a hatchway, in an endless path comprising two adjacent vertical portions thereof, past a plurality of floors, doors at said floors opening into said hatchway, and means for controlling the movement of said cages, including means for preventing the movement of said cages, once they are stopped, until a hatchway door is opened and reclosed.

19. In combination, a circuitous elevator having a plurality of cages movable in a hatchway, in an endless path comprising two adjacent vertical portions thereof, past a plurality of floors, doors at said floors opening into said hatchway, means for controlling the movement of said cages, including means movable in accordance with the movement of said cages for effecting the movement of said cages for a predetermined distance and then stopping them, and means for preventing the movement of said cages, once they are stopped, until a hatchway door is opened and reclosed.

20. In combination, a circuitous elevator having a plurality of cages movable in a hatchway, in an endless path comprising two adjacent vertical portions thereof, past a plurality of floors, doors at said floors opening into said hatchway, means for controlling the movement of said cages, including means movable in accordance with the movement of said cages for effecting the movement of said cages for a predetermined distance and then stopping them, and means for preventing the movement of said cages, once they are stopped, until a hatchway door is opened and reclosed, said preventing means including a relay having two windings, one of which is capable of actuating said relay and the other of which is capable only of maintaining said relay in an actuated condition once said relay is moved into an actuated condition.

21. In a circuitous elevator having a plurality of cages movable in an endless path, means for controlling the movement of said cages, including means movable in accordance with the movement of the cages for automatically effecting the acceleration of said cages from zero speed to a maximum speed and deceleration of said cages from the maximum speed to zero speed.

22. In a circuitous elevator having a plurality of spaced cages movable in succession in an endless path, motive means for moving the cages through the endless path, and means for controlling said motive means including a plurality of commutator members adapted to rotate simultaneously in coaxial relation, one of said commutator members comprising a plurality of conducting segments of predetermined angular width disposed in spaced angular relation with insulating segments therebetween, another of said commutator members comprising a plurality of conducting segments corresponding in number but being of lesser angular width than the conducting segments of said one commutator said one commutator being adapted to effect one speed of movement of said motive means and said second commutator being adapted to effect another speed of movement of said motive means.

HENRY D. JAMES.